United States Patent
Liu et al.

(10) Patent No.: US 12,278,555 B2
(45) Date of Patent: Apr. 15, 2025

(54) VARIABLE GAIN MODULATION METHODS AND CONTROLLERS FOR AC-DC CONVERTER WITH POWER FACTOR CORRECTION

(71) Applicant: Queen's University at Kingston, Kingston (CA)

(72) Inventors: Yan-Fei Liu, Kingston (CA); Binghui He, Kingston (CA); Yang Chen, Hefei (CN); Bo Sheng, Kanata (CA); Wenbo Liu, Shenzhen (CN)

(73) Assignee: Queen's University at Kingston, Kingston (CA)

( * ) Notice: Subject to any disclaimer, the term of this patent is extended or adjusted under 35 U.S.C. 154(b) by 259 days.

(21) Appl. No.: 17/973,616

(22) Filed: Oct. 26, 2022

(65) Prior Publication Data

US 2023/0126710 A1    Apr. 27, 2023

Related U.S. Application Data

(60) Provisional application No. 63/272,154, filed on Oct. 26, 2021.

(51) Int. Cl.
*H02M 1/15* (2006.01)
*H02M 1/10* (2006.01)
(Continued)

(52) U.S. Cl.
CPC ............ *H02M 1/15* (2013.01); *H02M 1/10* (2013.01); *H02M 1/4258* (2013.01); *H02M 3/01* (2021.05);
(Continued)

(58) Field of Classification Search
CPC .... H02M 1/0022; H02M 1/0048; H02M 1/10; H02M 1/15; H02M 1/42; H02M 1/4208;
(Continued)

(56) References Cited

U.S. PATENT DOCUMENTS

2015/0357912 A1* 12/2015 Perreault ........... H02M 3/33569
  363/126
2016/0359427 A1* 12/2016 Ghosh ................. H02M 1/4233
(Continued)

FOREIGN PATENT DOCUMENTS

WO    WO-2019144241 A1 *  8/2019   ........ H02M 3/33576

OTHER PUBLICATIONS

M. Chen et al., "Multitrack power factor correction architecture," 2018 IEEE Applied Power Electronics Conference and Exposition (APEC), San Antonio, TX, USA, 2018, pp. 737-745, doi: 10.1109/APEC.2018.8341094. (Year: 2018).*

*Primary Examiner* — Fred E Finch, III
(74) *Attorney, Agent, or Firm* — Stephen J. Scribner

(57) ABSTRACT

A controller for an AC-DC converter including a rectifier circuit that converts AC input voltage into DC output voltage uses control logic to control the rectifier circuit according to two or more operating modes. Each operating mode determines a gain of the rectifier circuit. The controller selects an operating mode from the two or more operating modes based on at least one of an AC input voltage value and a required DC output voltage value. The AC-DC converter provides a wide range of DC output voltage with power factor correction. The controller may be used with AC-DC converter topologies such as boost converter, isolated boost converter, PWM converter, LLC resonant converter, and LCC resonant converter.

25 Claims, 26 Drawing Sheets

(51) Int. Cl.
  *H02M 1/42* (2007.01)
  *H02M 3/00* (2006.01)
  *H02M 3/335* (2006.01)
(52) U.S. Cl.
  CPC .... *H02M 3/33571* (2021.05); *H02M 3/33573* (2021.05)
(58) Field of Classification Search
  CPC ....... H02M 1/4225–4258; H02M 3/01; H02M 3/33571; H02M 3/33573
  See application file for complete search history.

(56) References Cited

U.S. PATENT DOCUMENTS

| | | | |
|---|---|---|---|
| 2017/0016655 A1* | 1/2017 | Shinomoto | H02M 1/4225 |
| 2017/0063225 A1* | 3/2017 | Guo | H02M 3/158 |
| 2021/0021207 A1* | 1/2021 | Choi | H02M 7/2176 |
| 2021/0367522 A1* | 11/2021 | Mao | H02M 3/33571 |
| 2022/0158547 A1* | 5/2022 | Lind | H02M 1/4233 |
| 2022/0360175 A1* | 11/2022 | Peng | H02M 1/0003 |
| 2022/0393574 A1* | 12/2022 | Pervaiz | H02M 3/33592 |
| 2023/0111992 A1* | 4/2023 | Liu | H02M 1/10 363/21.02 |

* cited by examiner

VARIABLE GAIN MODULATION METHODS AND CONTROLLERS FOR AC-DC CONVERTER WITH POWER FACTOR CORRECTION

RELATED APPLICATION

This application claims the benefit of the filing date of Application No. 63/272,154, filed on Oct. 26, 2021, the contents of which are incorporated herein by reference in their entirety.

FIELD

The invention relates generally to the field of AC-DC converters. More specifically, the invention relates to controllers and control methods for AC-DC converters that implement two or more operating modes, wherein each operating mode determines a gain of the converter rectifier circuit and the AC-DC converter provides a wide range of DC output voltage with power factor correction.

BACKGROUND

A boost converter is commonly used as the AC-DC rectifier to achieve power factor correction. The output voltage of a boost converter will be higher than the peak value of the input AC voltage. For common applications, the AC voltage is changed from 90V to 264V to cover both 120V (60 Hz) AC system and 220V (50 Hz) AC voltage system. Therefore, the output voltage of the boost converter is usually regulated at 400V. Since (1) the load will generally require a voltage different from the boost output voltage (e.g., 400V), and (2) the load will require electrical isolation from the AC voltage, another DC-DC converter is needed to convert the 400V boost output voltage to the output voltage, Vout. FIG. 1 shows a typical circuit diagram to achieve this objective according to a prior approach. The capacitor CBST is used as an energy storage capacitor that stores the energy to buffer the pulsating input power from AC source. It contains an average voltage (DC voltage) of around 400V plus a double line frequency ripple (120 Hz for 60 Hz AC line and 100 Hz for 50 Hz line). The double line frequency ripple voltage is usually around 10 to 20V peak, depending on the design.

In some applications, the variation of the AC input voltage is large, such as from 90V to 264V, a 3:1 variation ratio. The variation of the output voltage is also large. For example, if the circuit of FIG. 1 is used to charge the battery of an electric vehicle (EV), the battery voltage will change from 250V (when the battery is fully discharged) to 430V (when the battery is fully charged). Therefore, when the input voltage is at the lowest level, such as 90V and the output voltage is at the highest level, such as 430V, the voltage gain is calculated as Vgain_max=430V/90V=4.8. When the input voltage is at the highest level, such as 264V and the output voltage is at the lowest level, such as 250V, the voltage gain is calculated as Vgain_min=250V/264V=0.95. In order to meet the EV battery charge requirement, the voltage gain of the EV charger will have a variation range of 4.8/0.95=5, which is a very large range. The prior approach can only achieve optimal performance at a very narrow range. For example, when input voltage is 220V, output battery voltage is between 330V to 380V, the power supply will achieve highest efficiency operation. When the input voltage and battery voltage is outside this range, the efficiency of the EV charger is significantly lower. Therefore the prior approach cannot achieve optimal performance over a wide voltage variation range, when the input voltage and output voltage have a large variation, such as described above.

SUMMARY

According to one aspect of the invention there is provided a controller for an AC-DC converter comprising a rectifier circuit that converts AC input voltage into DC output voltage, the controller comprising: control logic that controls the rectifier circuit according to two or more operating modes; wherein each operating mode of the two or more operating modes determines a gain of the rectifier circuit; wherein the controller selects an operating mode from the two or more operating modes based on at least one of an AC input voltage value and a required DC output voltage value; wherein the AC-DC converter provides a wide range of DC output voltage with power factor correction.

In one embodiment the operating modes include high-gain mode, low-gain mode, and zero-gain mode.

In one embodiment the high-gain mode, low-gain mode, and zero-gain mode are alternatively implemented by the controller.

In one embodiment the controller controls the rectifier circuit to operate in first and second modes; wherein the rectifier circuit operates in the first mode for a first integer value of a half-line period of the AC input voltage and the rectifier circuit operates in the second mode for a second integer value of the half-line period of the AC input voltage.

In one embodiment the DC output voltage contains a ripple voltage with a ripple frequency lower than an AC line frequency.

In one embodiment an LLC converter is used as the rectifier circuit.

In one embodiment the controller controls the rectifier circuit according to full-bridge operating mode, half-bridge operating mode, and non-operating mode; wherein the rectifier circuit is full-bridge operating mode for a first integer value of a half-line period of the AC input voltage; wherein the rectifier circuit is in half-bridge operating mode for a second integer value of the half-line period of the AC input line voltage; wherein the rectifier circuit is in non-operating mode for a third integer value of the half-line period of the AC input voltage.

In one embodiment the DC output voltage of the AC-DC converter contains a low frequency ripple voltage; wherein a frequency of the ripple voltage is related to the frequency of the AC input line voltage.

In one embodiment the rectifier circuit is in full-bridge mode when the input AC voltage is in a low range; the rectifier circuit is in half-bridge mode when the input AC voltage is in a high-range; the output DC voltage is regulated to a required DC value by changing the gain of the rectifier circuit in the full-bridge mode when input voltage is in the low range; the output DC voltage is regulated to the required DC value by changing the gain of the rectifier circuit in the half-bridge mode when input AC voltage is in the high range.

In one embodiment the output DC voltage is regulated to the required value by alternatingly operating the rectifier circuit between full-bridge mode and half-bridge mode when input AC voltage is between the low range and the high range.

In one embodiment the rectifier circuit operates in full-bridge mode for one integer value of the half-line period of the AC input voltage and stops operating for another integer value of half-line period of the AC input voltage.

In one embodiment the output DC voltage is regulated to the required value by changing the gain of the rectifier circuit when it is operating in full-bridge mode.

In one embodiment the output DC voltage is regulated to the required value by changing a ratio of the first and second integer values.

In one embodiment the output DC voltage is regulated to the required value by a combination of changing the gain of the rectifier circuit and changing of ratio of the first and second integer values.

In one embodiment the rectifier circuit operates in half-bridge mode for a first integer value of the half-line period of the AC input voltage and stops operating for a second integer value of the half-line period of the AC input voltage.

In one embodiment the output DC voltage is regulated to the required value by changing the gain of the rectifier circuit operating in half-bridge mode.

In one embodiment the controller controls the rectifier circuit so that the rectifier circuit is operating for a first portion of the AC input voltage half line period and the rectifier circuit is not operating for a second portion of the AC input voltage half line period.

In one embodiment the rectifier circuit is operating when an instantaneous AC input voltage is at or close to its peak value and the rectifier circuit is not operating when the instantaneous AC input voltage is at or close to its zero-crossing value.

In one embodiment the rectifier circuit is operating when an instantaneous AC input voltage is at its peak value±45 degrees and the rectifier circuit is not operating when the instantaneous AC input voltage is at its zero-crossing value±45 degrees.

In one embodiment the output DC voltage is regulated by controlling AC input power to the rectifier circuit during a time interval when the rectifier circuit is operating.

In one embodiment the output DC voltage is regulated by controlling a duration of a time interval when the rectifier circuit is operating.

In one embodiment the rectifier circuit is operating during a first portion of the AC input voltage half line cycle when an instantaneous AC input voltage is substantially different from an AC input peak voltage value and the rectifier circuit is not operating for the rest of the AC input voltage half line cycle.

In one embodiment the rectifier circuit is operating during a first portion of the AC input voltage half line cycle when an instantaneous AC input voltage is from 0 to 45 degrees or from 135 to 180 degrees from an AC input peak voltage value and the rectifier circuit is not operating for the rest of the AC input voltage half line cycle.

In one embodiment the controller is implemented at least in part in computer-executable instructions stored on non-transitory computer-readable storage media, and the controller includes a computer or other processor that executes the stored instructions.

According to another aspect of the invention there is provided an AC-DC converter comprising a controller in accordance with embodiments described herein.

The AC-DC converter may be a boost converter, isolated boost converter, PWM converter, LLC resonant converter, or LCC resonant converter.

According to another aspect of the invention there is provided a method for controlling an AC-DC converter, comprising using a controller comprising control logic to control a rectifier circuit of the AC-DC converter according to two or more operating modes; wherein each operating mode of the two or more operating modes determines a gain of the rectifier circuit; wherein the controller selects an operating mode from the two or more operating modes based on at least one of an AC input voltage value and a required DC output voltage value; wherein the AC-DC converter provides a wide range of DC output voltage with power factor correction.

In one embodiment of the method the operating modes include high-gain mode, low-gain mode, and zero-gain mode.

In one embodiment of the method the high-gain mode, low-gain mode, and zero-gain mode are alternatively implemented by the controller.

In one embodiment of the method the controller controls the rectifier circuit to operate in first and second modes; wherein the rectifier circuit operates in the first mode for a first integer value of a half-line period of the AC input voltage and the rectifier circuit operates in the second mode for a second integer value of the half-line period of the AC input voltage.

In one embodiment of the method the DC output voltage contains a ripple voltage with a ripple frequency lower than an AC line frequency.

In one embodiment of the method an LLC converter is used as the rectifier circuit.

In one embodiment of the method the controller controls the rectifier circuit according to full-bridge operating mode, half-bridge operating mode, and non-operating mode; wherein the rectifier circuit is full-bridge operating mode for a first integer value of a half-line period of the AC input voltage; wherein the rectifier circuit is in half-bridge operating mode for a second integer value of the half-line period of the AC input line voltage; wherein the rectifier circuit is in non-operating mode for a third integer value of the half-line period of the AC input voltage.

In one embodiment of the method the DC output voltage of the AC-DC converter contains a low frequency ripple voltage; wherein a frequency of the ripple voltage is related to the frequency of the AC input line voltage.

In one embodiment of the method the rectifier circuit is in full-bridge mode when the input AC voltage is in a low range; the rectifier circuit is in half-bridge mode when the input AC voltage is in a high-range; the output DC voltage is regulated to a required DC value by changing the gain of the rectifier circuit in the full-bridge mode when input voltage is in the low range; the output DC voltage is regulated to the required DC value by changing the gain of the rectifier circuit in the half-bridge mode when input AC voltage is in the high range.

In one embodiment of the method the output DC voltage is regulated to the required value by alternatingly operating the rectifier circuit between full-bridge mode and half-bridge mode when input AC voltage is between the low range and the high range.

In one embodiment of the method the rectifier circuit operates in full-bridge mode for one integer value of the half-line period of the AC input voltage and stops operating for another integer value of half-line period of the AC input voltage.

In one embodiment of the method the output DC voltage is regulated to the required value by changing the gain of the rectifier circuit when it is operating in full-bridge mode.

In one embodiment of the method the output DC voltage is regulated to the required value by changing a ratio of the first and second integer values.

In one embodiment of the method the output DC voltage is regulated to the required value by a combination of changing the gain of the rectifier circuit and changing of ratio of the first and second integer values.

In one embodiment of the method the rectifier circuit operates in half-bridge mode for a first integer value of the half-line period of the AC input voltage and stops operating for a second integer value of the half-line period of the AC input voltage.

In one embodiment of the method the output DC voltage is regulated to the required value by changing the gain of the rectifier circuit operating in half-bridge mode.

In one embodiment of the method the controller controls the rectifier circuit so that the rectifier circuit is operating for a first portion of the AC input voltage half line period and the rectifier circuit is not operating for a second portion of the AC input voltage half line period.

In one embodiment of the method the rectifier circuit is operating when an instantaneous AC input voltage is at or close to its peak value and the rectifier circuit is not operating when the instantaneous AC input voltage is at or close to its zero-crossing value.

In one embodiment of the method the rectifier circuit is operating when an instantaneous AC input voltage is at its peak value±45 degrees and the rectifier circuit is not operating when the instantaneous AC input voltage is at its zero-crossing value±45 degrees.

In one embodiment of the method the output DC voltage is regulated by controlling AC input power to the rectifier circuit during a time interval when the rectifier circuit is operating.

In one embodiment of the method the output DC voltage is regulated by controlling a duration of a time interval when the rectifier circuit is operating.

In one embodiment of the method the rectifier circuit is operating during a first portion of the AC input voltage half line cycle when an instantaneous AC input voltage is substantially different from an AC input peak voltage value and the rectifier circuit is not operating for the rest of the AC input voltage half line cycle.

In one embodiment of the method the rectifier circuit is operating during a first portion of the AC input voltage half line cycle when an instantaneous AC input voltage is from 0 to 45 degrees or from 135 to 180 degrees from an AC input peak voltage value and the rectifier circuit is not operating for the rest of the AC input voltage half line cycle.

In various embodiments of the method the AC-DC converter may be a boost converter, isolated boost converter, PWM converter, LLC resonant converter, or LCC resonant converter.

According to another aspect of the invention there is provided non-transitory computer readable media for use with a processor, the computer readable media having stored thereon instructions that direct the processor to execute processing steps including controlling a rectifier circuit of an AC-DC converter in accordance with embodiments described herein.

BRIEF DESCRIPTION OF THE DRAWINGS

For a better understanding of the invention, and to show more clearly how it may be carried into effect, embodiments will be described, by way of example, with reference to the accompanying drawings, wherein.

Figure 21A:
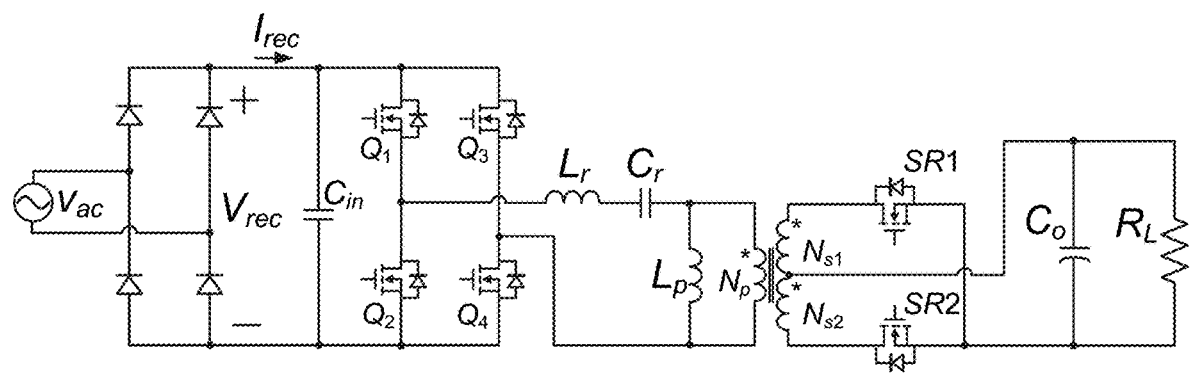

FIG. 21A is a circuit diagram of an LLC converter that may be used as an AC-DC rectifier with power factor correction, according to the prior art.

Figure 21B:
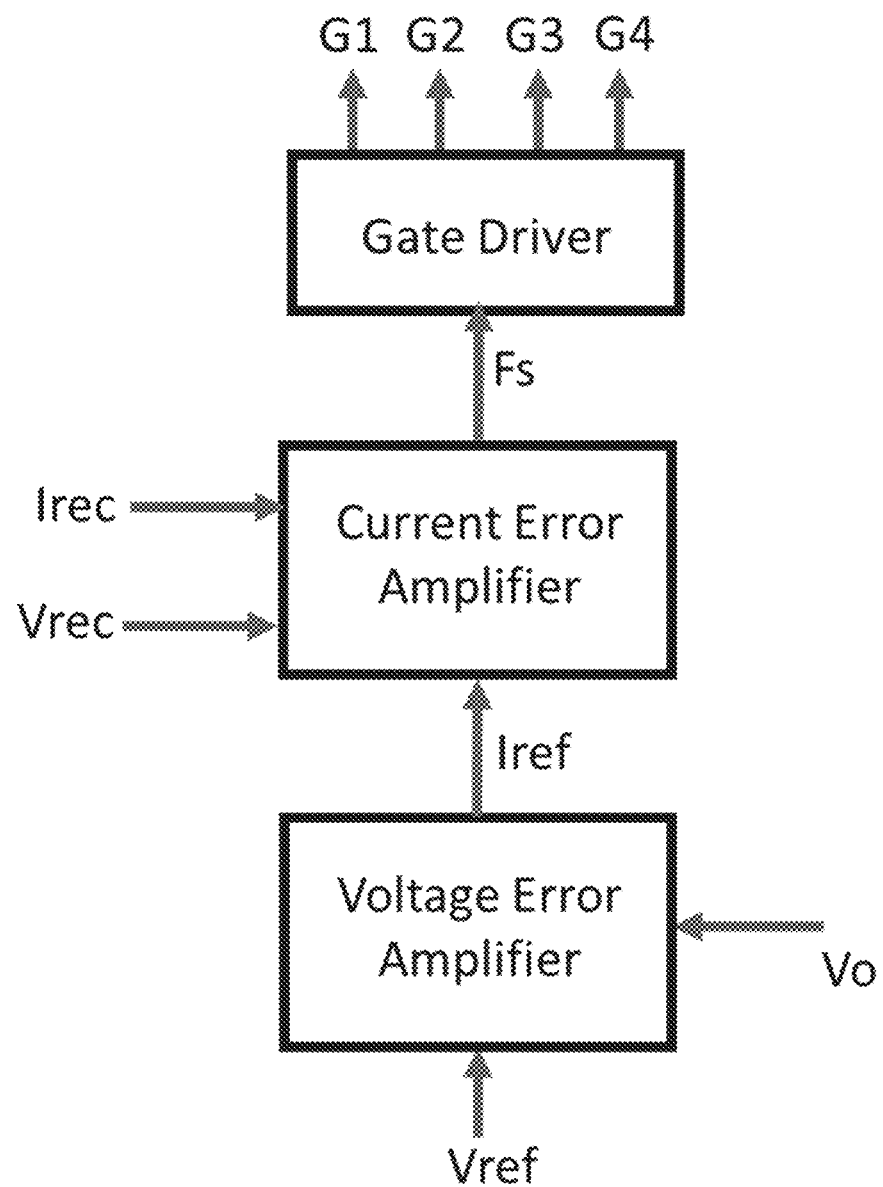

FIG. 21B is a control block diagram for controlling an LLC converter to achieve PFC operation.

Figure 22:
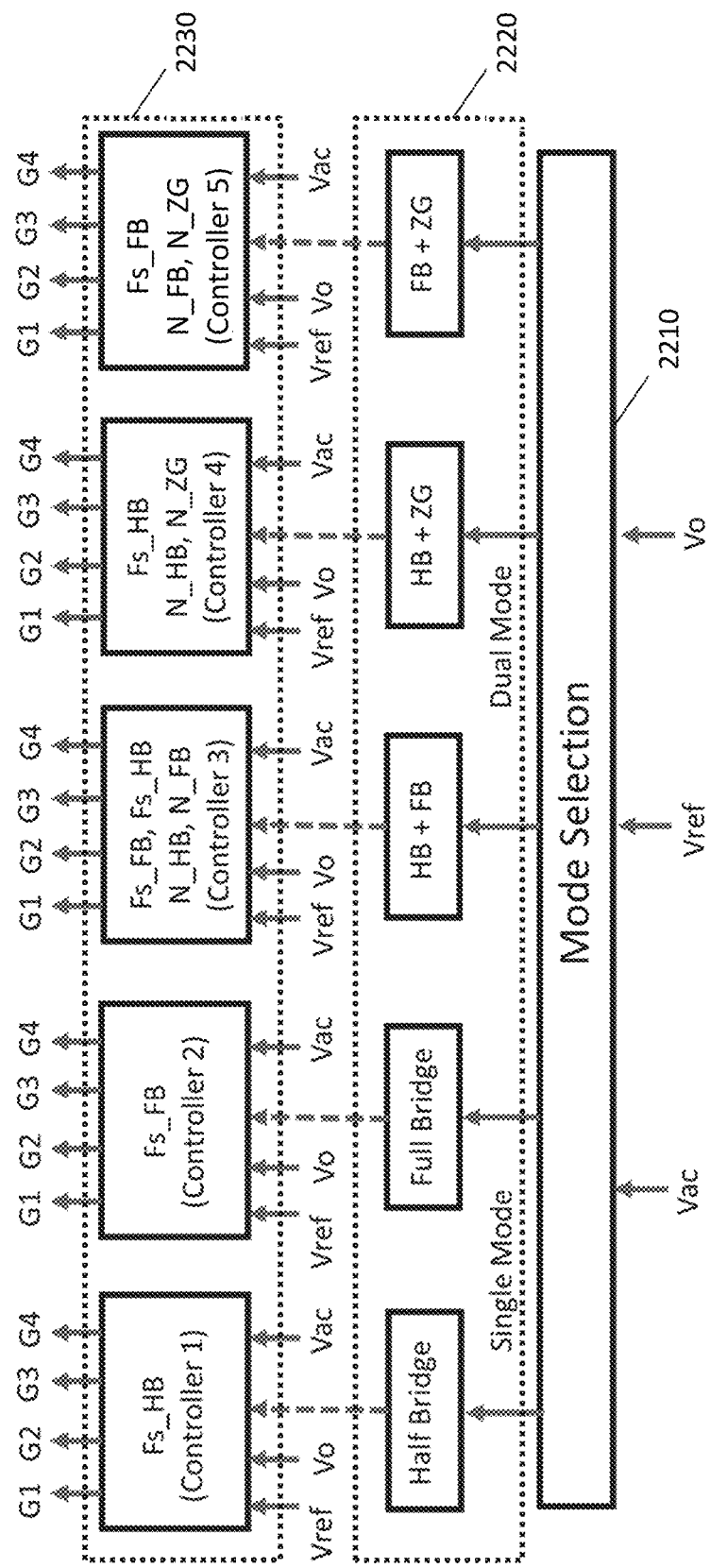

FIG. 22 is a control block diagram for an AC-DC rectifier, according to one embodiment.

Figure 23:
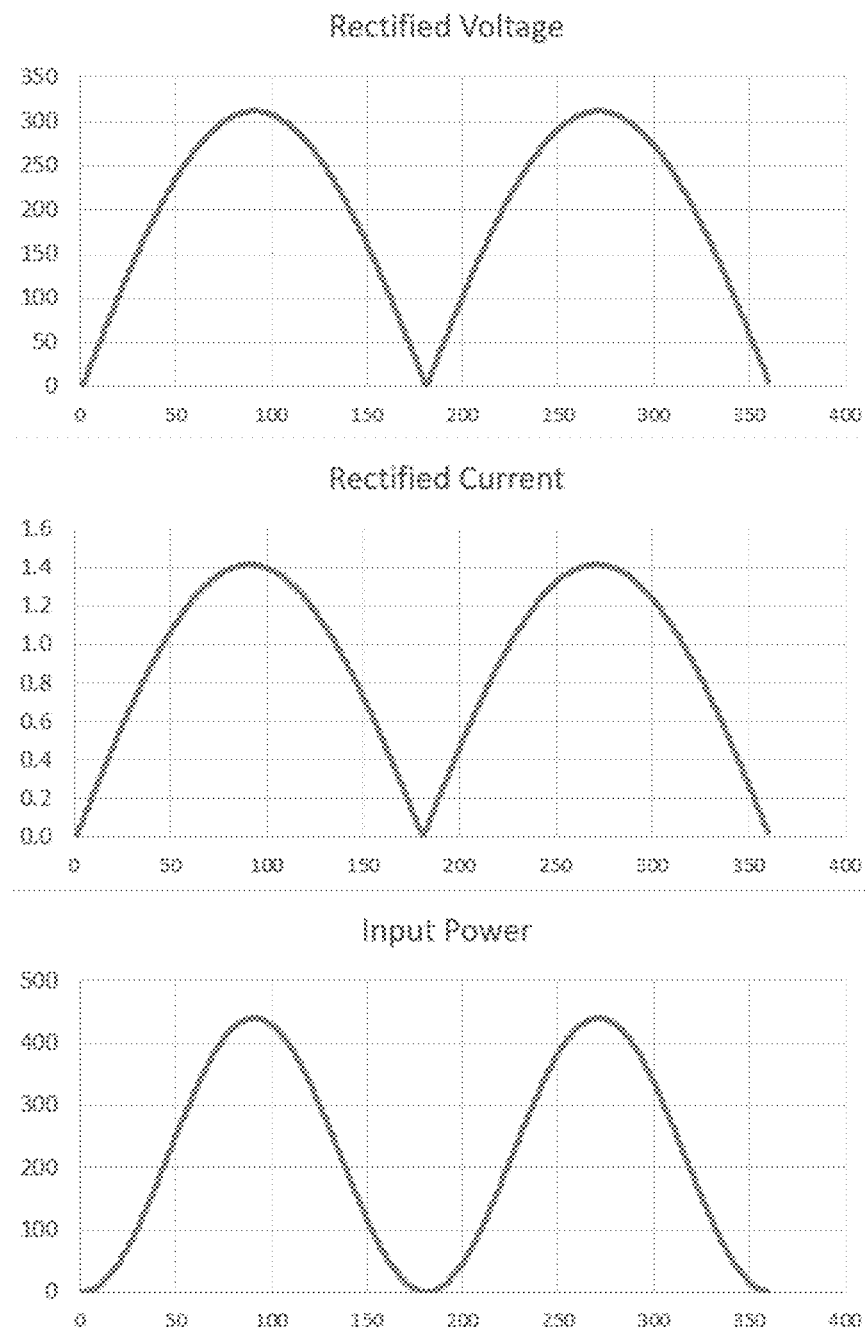

FIG. 23 shows waveforms for an LLC converter under conventional control in PFC mode, wherein the x-axes are degrees, and the rectified input voltage (top), current (middle), and input power (bottom) waveforms are shown, according to the prior art.

Figure 24:
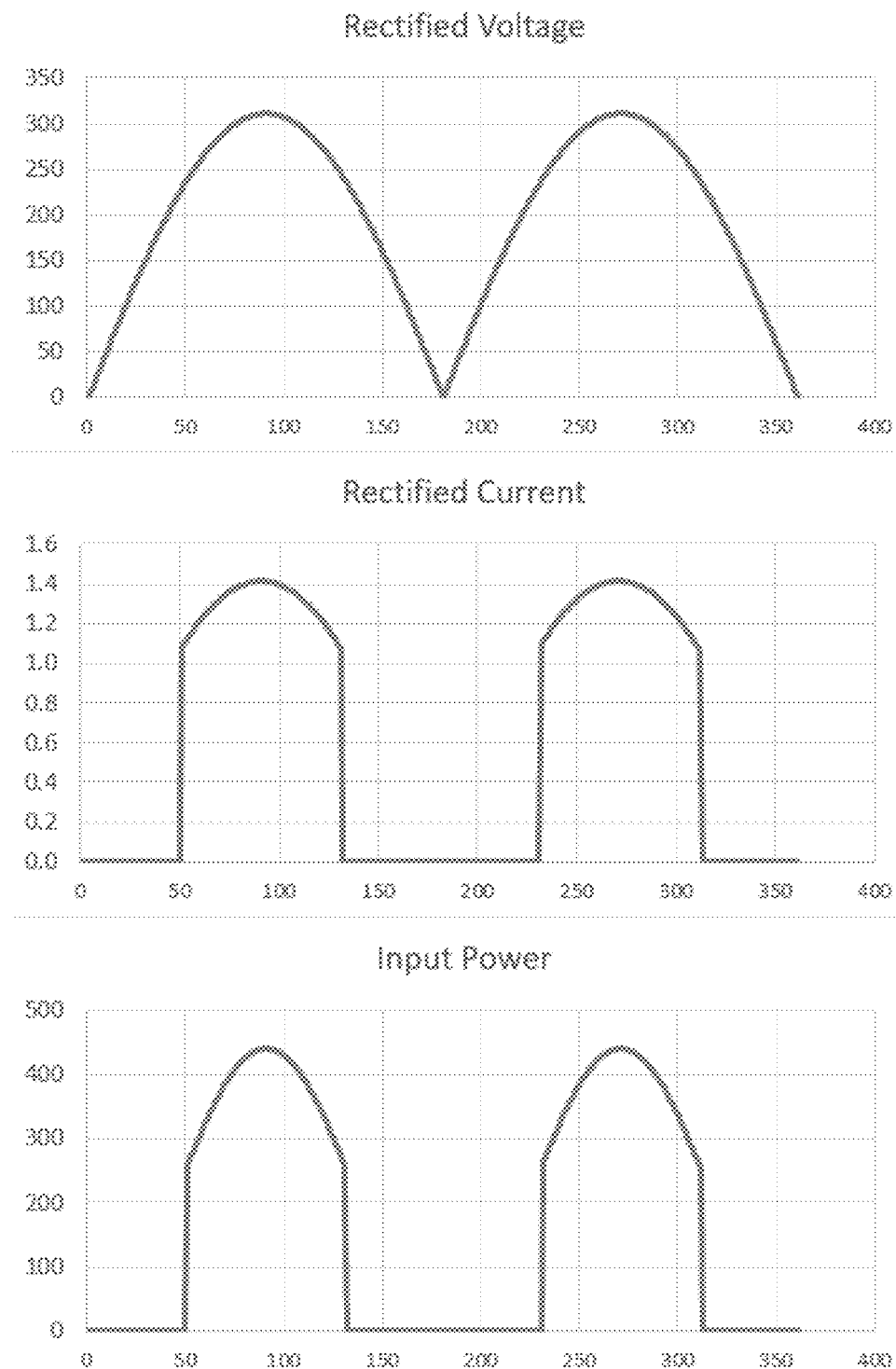

FIG. 24 shows waveforms for inner-line frequency modulation implemented for an LLC converter wherein the converter is on from 50-degree to 130-degree, according to one embodiment.

Figure 25:
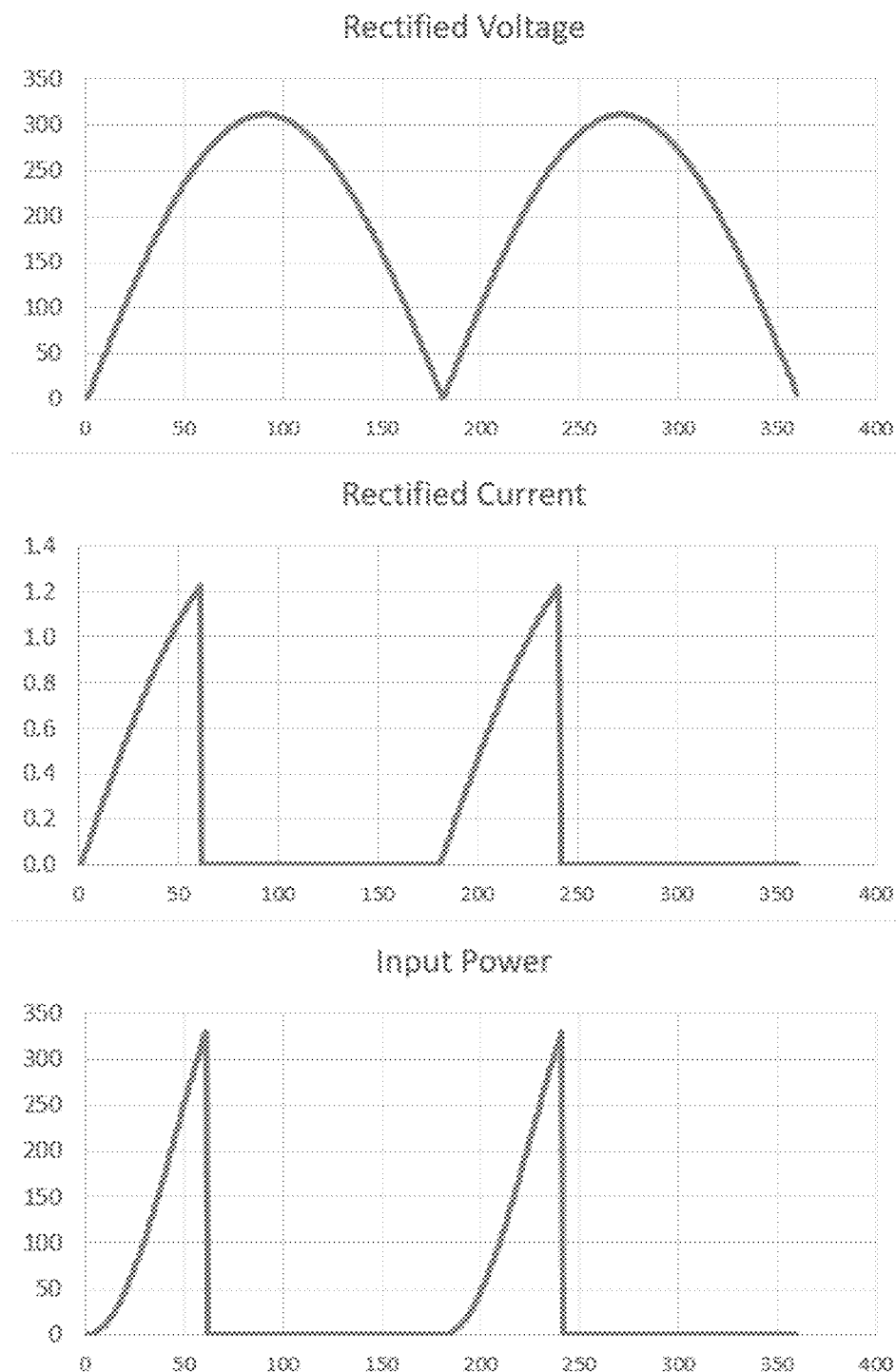

FIG. 25 shows waveforms for inner-line frequency modulation implemented for an LLC converter, according to one embodiment.

Figure 26:
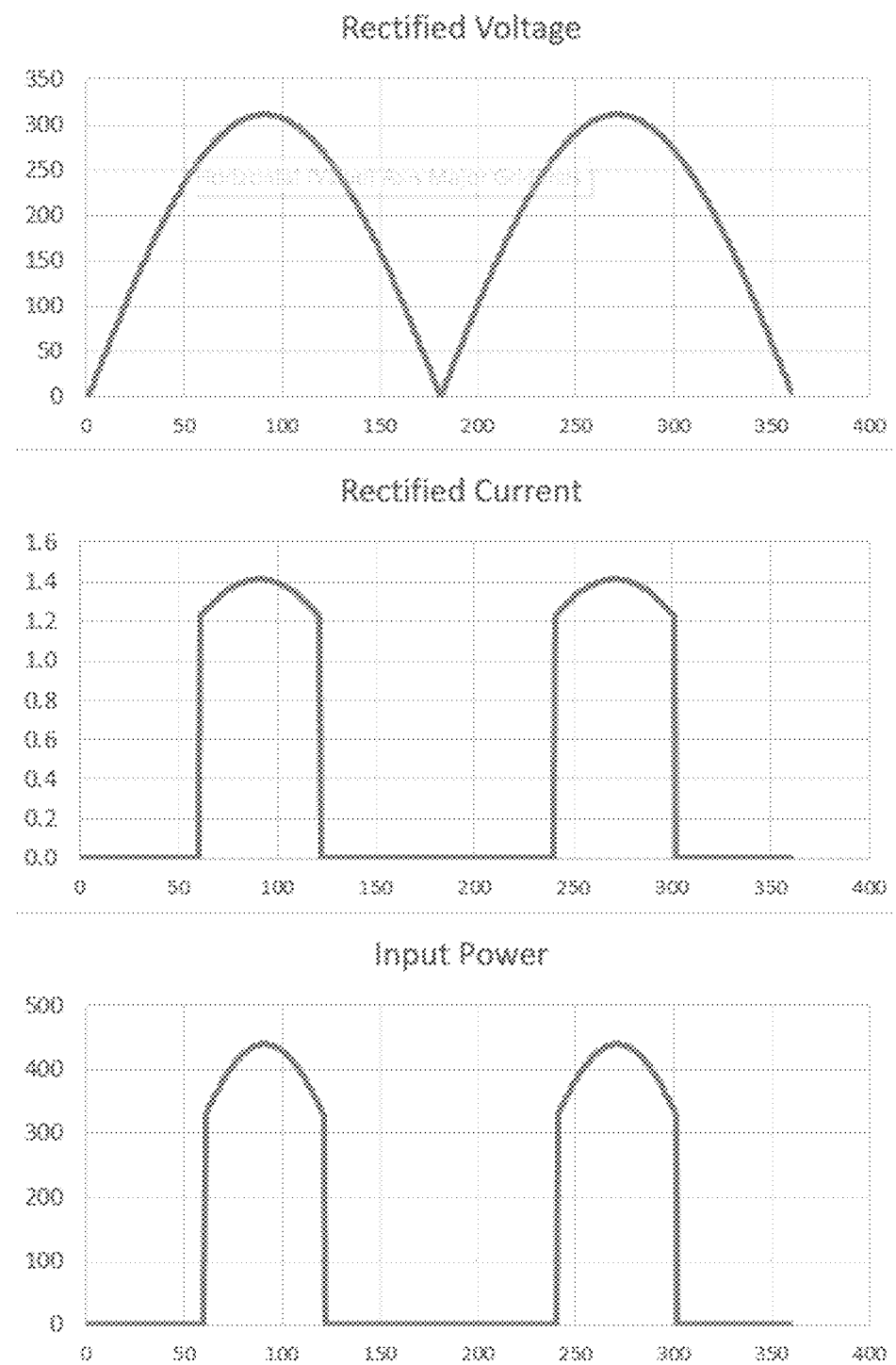

FIG. 26 shows waveforms for inner-line frequency modulation implemented for an LLC converter, wherein the converter is on from 60-degree to 120-degree, according to one embodiment.

Figure 27:
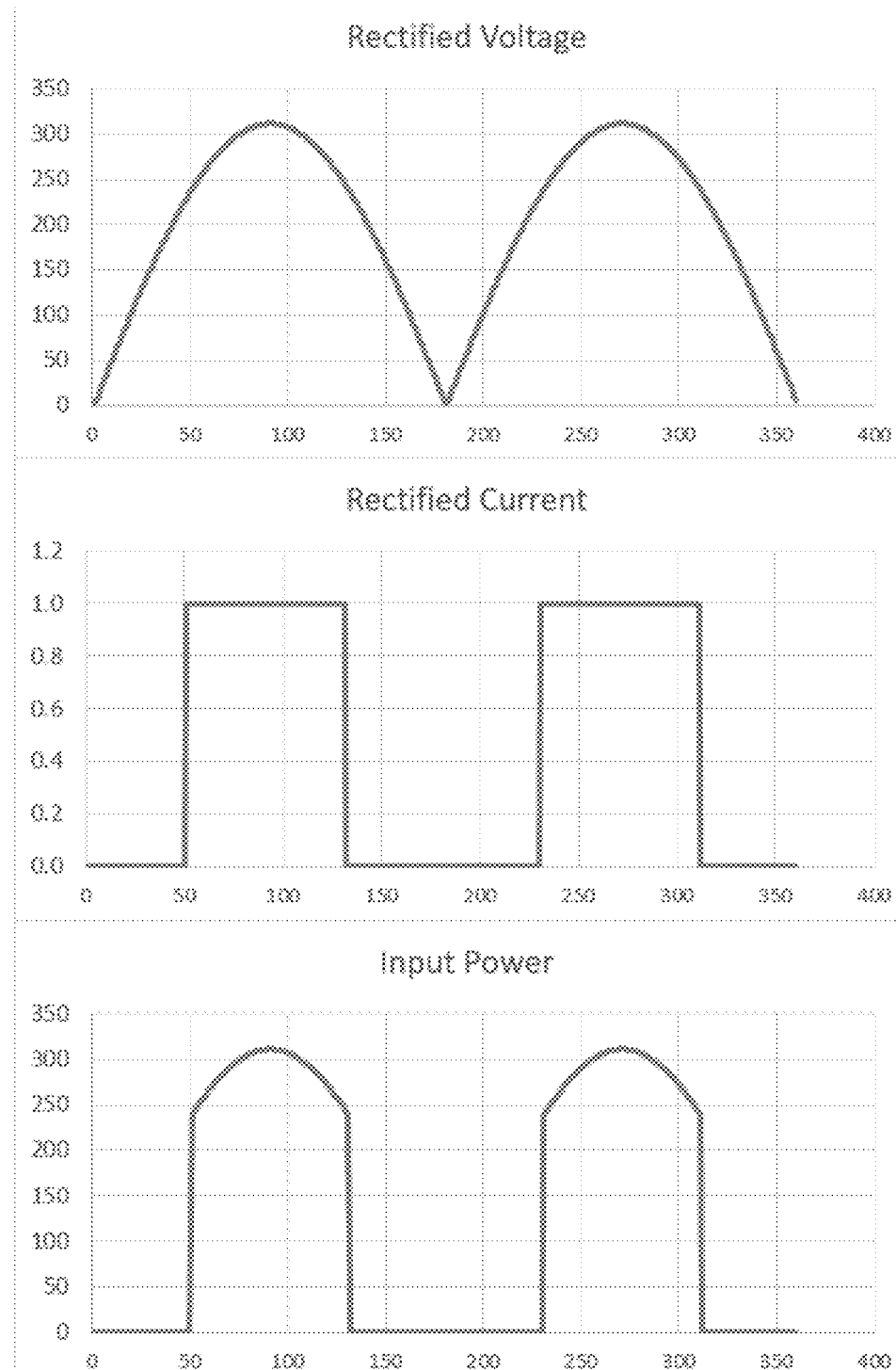

FIG. 27 shows waveforms for inner-line frequency modulation when current is controlled to be constant, according to one embodiment.

Figure 28:
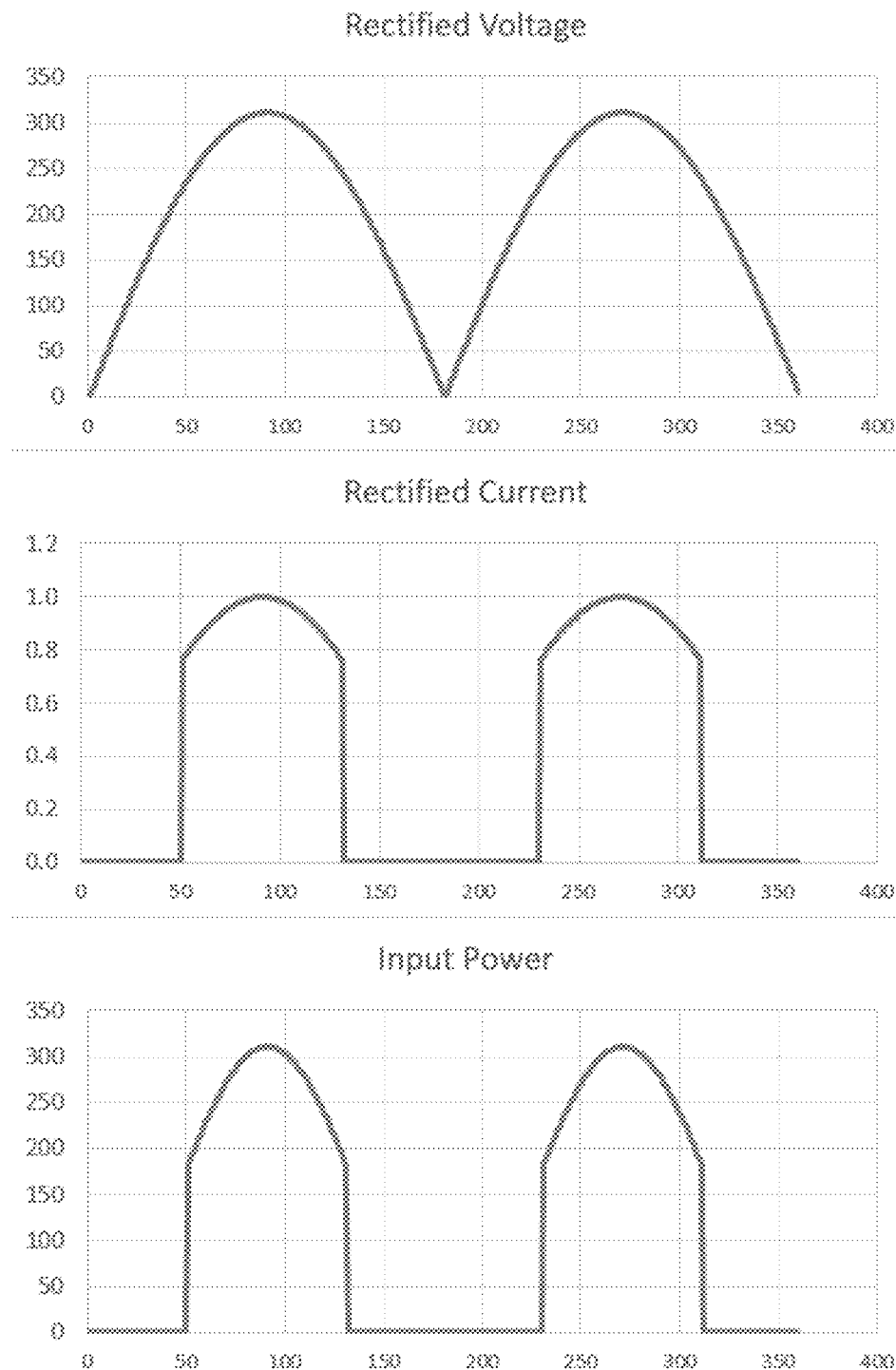

FIG. 28 shows waveforms for inner-line frequency modulation with peak current of 1 A, reduced from 1.4 A, according to one embodiment.

Figure 29:
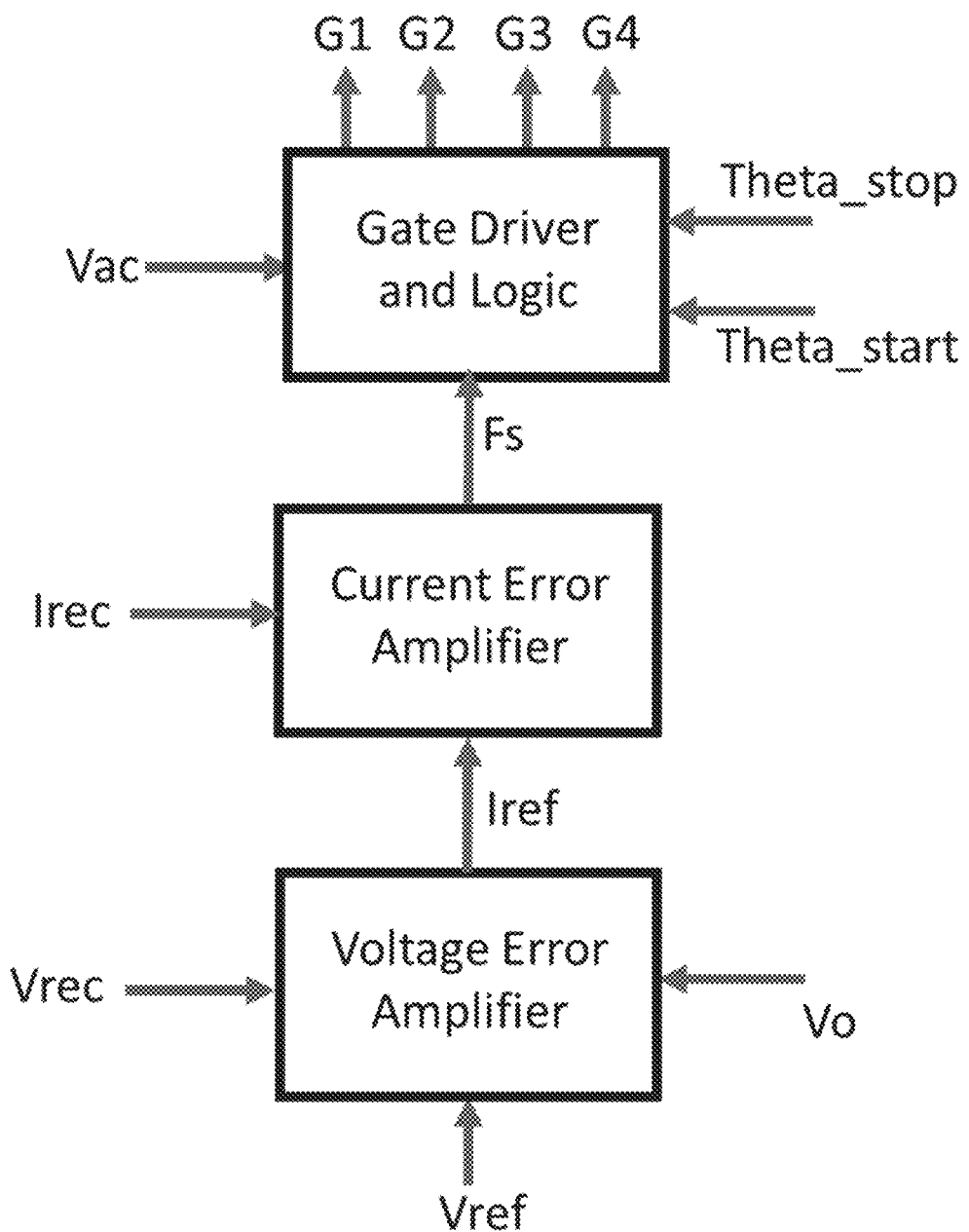

FIG. 29 is a control block diagram for an inner-line frequency modulation control strategy, according to one embodiment.

DETAILED DESCRIPTION OF EMBODIMENTS

1 Switching Converters with Two or More Operating Modes

Described herein are controllers and circuits for an AC-DC rectifier for applications with large input and output voltage variation range, wherein the AC-DC rectifier has two or more voltage gains and the AC-DC rectifier performs under optimal operating condition over the entire input and output voltage variation range.

Accordingly, embodiments provide a power converter that has two or more operating mode and produces two or more voltage gains, both or all of which achieve optimal operation (such as high efficiency operation), and a method for controlling the input power of the power converter so that the output power may be controlled over a wide range and the power converter is always operating at optimal condition, that is, at high efficiency or the most efficient condition when the converter is producing different (e.g., high or low) output power. According to embodiments, the control method is applied to the AC input and the input AC current follows the shape of the AC voltage to achieve power factor correction. The control method may be used to select the operation mode to achieve power factor correction over wide input voltage variation range and output voltage variation range and at different power levels, so that the power converter maintains high efficiency operation in the two or more operating modes. The output DC voltage contains low frequency ripple that is approximately two times the AC line frequency. The input AC side and output DC side have electrical isolation. The input voltage variation range may at least a 2:1 ratio. For example, in one embodiment the input voltage variation range may be a 3:1 ratio, e.g., from about 90V to about 264V.

As used herein, the terms "converter", "switching converter", "power converter", "AC-DC converter", "rectifier", and "AC-DC rectifier" are used interchangeably and refer to a converter based on a topology such as, but not limited to, boost, PWM converters, full-bridge, half-bridge, LLC, LCL, and resonant converters. The terms "rectifier" and "AC-DC rectifier" may be used when the input to the converter is an AC voltage.

As used herein, the terms "control" and "controller" are used interchangeably and may refer to control algorithms (e.g., logic, computer software stored on non-transient computer readable media) and/or circuits (e.g., logic circuits, electronic hardware).

As used herein, the term "substantially" as used with respect to a value or condition refers to a value or condition that is the same as, or close to a desired or selected value or condition, as may be achieved within tolerances of circuit components, control parameters, etc. By using the term "substantially" it is understood that a recited characteristic, parameter, and/or value need not be achieved exactly, but that deviations or variations, including for example, tolerances, measurement error, measurement accuracy limitations and other factors known to those of ordinary skill in the art, may occur in amounts that do not preclude the effect the characteristic, parameter, and/or value was intended to provide. A characteristic, parameter, and/or value that is substantially absent (e.g., substantially removed, substantially zero) may be one that is within the noise, beneath background, below detection limits, or a small fraction (e.g., <1%, <0.1%, <0.01%, <0.001%, <0.00001%, <0.000001%, <0.0000001%) of the significant characteristic. It is understood that a characteristic, parameter, and/or value that is referred to herein as being the "same" as another characteristic, parameter, and/or value may be substantially the same as the other characteristic, parameter, and/or value.

Simulations described herein were conducted using PSIM Professional version 2021b.1.7 (Powersim Inc., Troy, MI, USA).

A controller may be implemented to control operation of the converter, which may include implementing a gain modulation strategy as described herein. The controller may perform one or more operations such as, for example, but not limited to, input and/or output voltage and/or current sensing, generating voltage and/or current reference signals, power factor correction, and generating gate drive signals for switches (e.g., MOSFETs, IGBTs, etc.) of the converter.

The controller may include an electronic processor and a memory. The processor may be, for example, a computer, or a digital controller such as a microcontroller unit (MCU), field programmable gate array (FPGA), etc. The processor may include processing capabilities as well as an input/output (I/O) interface through which the processor may receive a plurality of input signals (e.g., voltage and/or current sensing signals, voltage and/or current reference signals), and generate a plurality of output signals (e.g., gate drive signals for switches of the converter). The memory is provided for storage of data and instructions or code (i.e., an algorithm, such as a controller algorithm, controller logic, software, etc.) executable by the processor. The memory may include various forms of non-volatile (i.e., non-transitory) memory including flash memory or read only memory (ROM) including various forms of programmable read only memory (e.g., PROM, EPROM, EEPROM) and/or volatile memory including random access memory (RAM) including static random access memory (SRAM), dynamic random access memory (DRAM) and synchronous dynamic random access memory (SDRAM). A converter may include a driver circuit or device to interface between outputs of the controller and the control (e.g., gate) terminals of the semiconductor switches.

The memory stores executable code including control logic which is configured to control the overall operation of a converter in accordance with a desired control strategy, such as a converter gain modulation strategy as described herein. For example, the control logic, when executed by the processor, is configured to generate, in response to one or more input signals, the various gate drive signals for the switches of the converter. The control logic may include programmed logic blocks to implement specific functions, for example, including without limitation, zero crossing detection, error amplifier, pulse width modulation (PWM), power factor correction (PFC), zero voltage switching (ZVS), rms voltage and/or current calculator, operating mode control logic, and startup and/or shut down strategy. The memory may also store features, e.g., a lookup table that may be accessed by the control logic. Non-limiting examples of control strategies, or parts thereof, that may be implemented separately or in various combinations in controllers according to embodiments described herein are shown in FIGS. 21B, 22, 29, and/or to control strategies for a rectifier circuit to achieve performance characteristics such as, but not limited to, those shown by example in waveforms of FIGS. 7A, 7B, 8-20, and 24-28.

Control methods described herein may implement at least one modulation strategy. In one embodiment, a modulation strategy includes changing the voltage gain from one AC line cycle to the next AC line cycle, referred to herein as sub-line frequency modulation, or as sub-F_line modulation. This may include changing the operation mode of the converter at a frequency lower than the line frequency (or AC line frequency, 50 Hz in Asia, Europe and 60 Hz in North America). Operation modes may include high voltage gain, low voltage gain, and zero voltage gain. The sub-F_line modulation frequency (F_lineM) is lower than the AC line frequency, such as 10 Hz or 20 Hz.

In another embodiment, a modulation strategy includes changing the voltage gain from one half line cycle to the next half line cycle, referred to herein as half line frequency modulation.

In another embodiment, a modulation strategy includes changing the voltage gain within a half AC line cycle, referred to herein as inner-half line cycle modulation.

In another embodiment, referred to as sub-switching frequency modulation, or sub-Fs modulation, the operation mode of the converter is changed at a frequency that is lower than the switching frequency and higher than the AC line frequency. For example, the line frequency may be 50 Hz or 60 Hz, and the switching frequency may be 500 kHz. The sub-Fs modulation frequency (F_SM) may be, e.g., about 20 kHz. During the sub-Fs modulation period, T_SM, the converter operates according to one of three possible modes: high voltage gain, low voltage gain, and zero voltage gain.

According to embodiments, an energy storage component may be used to hold the output voltage at a selected DC level. The energy storage component, for example, a capacitor, delivers additional power to the load when the instantaneous input power is lower than the load power and store the extra power when the instantaneous input power is larger than the load power.

An AC-DC rectifier has been used extensively in industry applications. When the output power is more than 75 W, Power Factor Correction (PFC) is required. With PFC, the input AC current is controlled to be the shape and same phase as the input AC voltage. In practical application, the AC voltage is a sinusoidal waveform. Therefore, the AC current is also a sinusoidal waveform.

Figure 2:
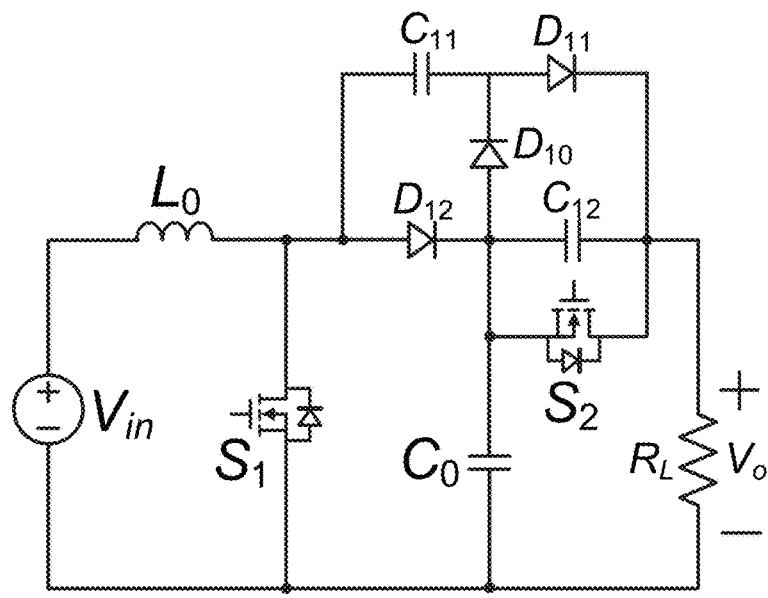
FIG. 2 is a circuit diagram of a boost converter with voltage doubler, according to the prior art.

A conventional boost converter with voltage doubler is shown in FIG. 2. When the capacitor C12 is shorted by a MOSFET S2, the output voltage of the boost converter is:

$$V\_gain\_low = V\text{boost\_low}/V\text{in} = 1/(1-D) \quad (1)$$

where D is the duty cycle of the switch S1. When the MOSFET S2 is off, the boost converter operates in voltage doubler mode. The output voltage of the boost converter is:

$$V\_gain\_high = V\text{boost\_high}/V\text{in} = 2/(1-D) \quad (2)$$

By controlling S2 on and off, the VD boost converter can operate at two voltage gains with the same duty cycle. It is noted that in the above example, the VD boost converter has two possible operation modes.

Operation mode #1: When S2 is on and the VD boost converter produces the voltage gain as expressed by equation (1) with duty cycle D, Gain_low.

Operation mode #2: When S2 is off and the VD boost converter produces the voltage gain as expressed by equation (2) with same duty cycle as in operation mode #1, Gain_high=2*Gain_low.

For a boost converter, it is not desirable to operate at very small duty cycle (such as less than about 30%) or very large duty cycle, such as above about 70%. Therefore, by turning S2 on and off in the VD boost converter as shown in FIG. 2, a very wide operation gain can be achieved while the duty cycle is remains at desirable range (between about 30% and about 70%).

For example, for the conventional boost converter, when D is between 30% and 70%, the voltage gain is changed from $$\text{Gain1} = 1/(1-0.3) = 1.43 \quad (3.1)$$

to $$\text{Gain2} = 1/(1-0.7) = 3.33 \quad (3.2)$$

The voltage gain variation range is:

$$\text{Gain\_range1} = 3.33/1.43 = 2.33 \quad (3.3)$$

When both operation modes are used, the voltage gain is changed from $$\text{Gain1} = 1/(1-0.3) = 1.43, \text{ when switch } S2 \text{ is on} \quad (3.4)$$

to $$\text{Gain3} = 2/(1-0.7) = 6.67, \text{ when } S2 \text{ is off,} \quad (3.5)$$

Therefore, the voltage gain variation range is $$\text{Gain\_range2} = 6.67/1.43 = 4.67 \quad (3.6)$$

It is noted that a switching converter such as shown in FIG. 2 can provide two voltage gains with the same operating condition, such as same duty cycle in this case, under two operation modes. In some cases, the term "same operation condition" means similar switching frequency for resonant converters.

Figure 3:
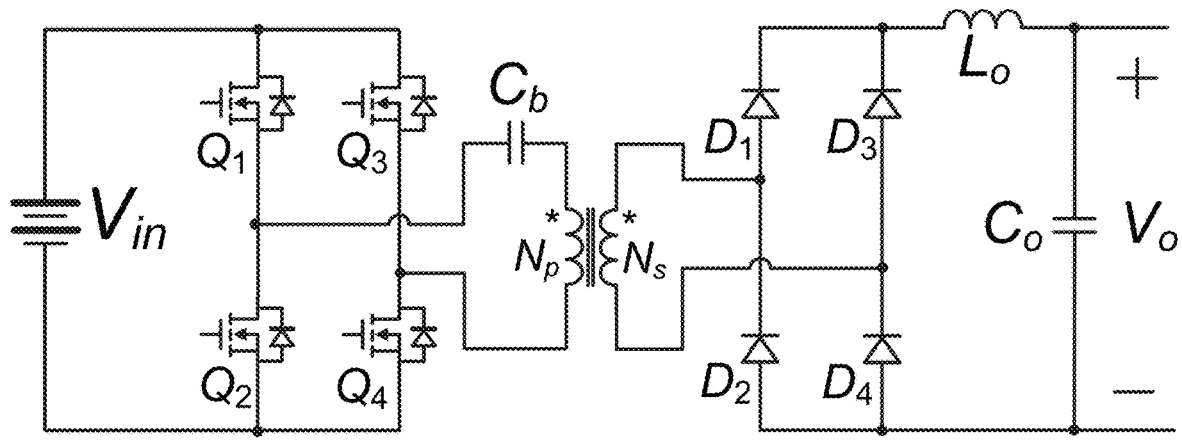
FIG. 3 is a circuit diagram of a full-bridge pulse width modulation (PWM) converter, according to the prior art.

FIG. 3 is a circuit diagram of a conventional full-bridge PWM converter. In the circuit, capacitor Cb is used to block any possible DC voltage from the full-bridge output. When all four switches Q1, Q2, Q3, and Q4 are switching based on PWM control, the voltage gain can be calculated as:

$$\text{Gain\_FB\_PWM1} = Vo/Vin = D*Ns/Np \quad (4)$$

where Np is the number of turns of the primary winding of the transformer and Ns is the number of turns of the secondary winding, and D is the duty cycle.

Another operating mode of the full-bridge PWM converter shown in FIG. 3 is Q3 and Q4 are switched based on PWM control and Q1 is turned off and Q2 is turned on all the time (no switching). Equivalently, under this control the converter operates at half-bridge mode. The voltage gain can be calculated as:

$$\text{Gain\_FB\_PWM2} = \text{Gain\_HB\_PWM} = V_o/V_{in} = 0.5 * D * N_s/N_p \quad (5)$$

From equation (4) and (5), it is observed that the full-bridge PWM converter can produce two voltage gains with different control strategies when same duty cycle D is used.

Figure 4:
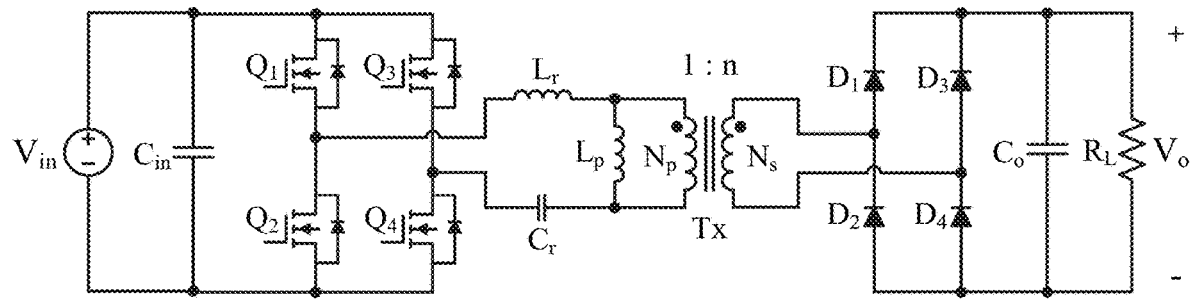
FIG. 4 a circuit diagram of a full-bridge LLC DC-DC converter, according to the prior art.

FIG. 4 is a circuit diagram of a full-bridge LLC converter according to the prior art. In the figure, Cr, Lr, and Lp are resonant components and Q1, Q2, Q3, and Q4 are the switches of the full-bridge configuration. The secondary side is a full wave rectifier with diode bridge. A half wave rectifier with center tapped transformer can also be used. In addition, a synchronous rectifier (SR) can be used to replace the diodes to reduce the loss of the secondary side circuit. Different secondary side configurations do not impact the control strategies presented herein.

Using Fundamental Harmonic Approximation (FHA) method, the approximate output voltage of the full-bridge LLC converter can be expressed as the following equation:

$$\text{Gain\_FB\_LLC} = \frac{V_o}{V_{in}} = \frac{n}{\sqrt{\left[1 + \frac{1}{K}\left(1 - \frac{1}{fn^2}\right)\right] + Q^2\left(f_n - \frac{1}{fn}\right)^2}} \quad (6)$$

where the transformer turns ratio (n), series resonant frequency ($f_r$), normalized frequency ($f_n$), inductance ratio (K), and quality factor (Q) are as follows:

$$n = \frac{N_s}{N_p}, \quad f_r = \frac{1}{2\pi\sqrt{L_r C_r}}, \quad f_n = \frac{f_{sw}}{f_r}, \quad K = \frac{L_p}{L_r}, \quad Q = \frac{\pi^2 \times \sqrt{L_r/C_r}}{8 \times n^2 \times R_L}$$

Similarly, another operation mode of the full-bridge LLC converter is that Q3 and Q4 operates at switching frequency modulation control. Q1 is turned off and Q2 is turned on all the time (no switching). This converter operates at half-bridge mode. Then the voltage gain can be calculated as:

$$\text{Gain\_HB\_LLC} = \frac{V_o}{V_{in}} = \frac{0.5 * n}{\sqrt{\left[1 + \frac{1}{K}\left(1 - \frac{1}{fn^2}\right)\right] + Q^2\left(f_n - \frac{1}{fn}\right)^2}} \quad (7)$$

From equation (6) and (7), it is observed that the full-bridge LLC converter, as shown in FIG. 4, can produce two voltage gains using same switching frequency under different operating modes (full-bridge and half-bridge). One is to make the LLC converter operate at full-bridge operation mode and the other is to make the LLC converter operate at half-bridge operation mode.

1 Two Voltage Gains

It is noted from the above discussion that some switching power converters, as those shown in FIGS. 2, 3, and 4, may produce two voltage gains. More specifically, these converters have the following features:

(1) They have two operating modes which produce two voltage gains using the same control parameter value, such as same duty cycle (for PWM converter, FIGS. 2, 3) or same switching frequency (for resonant converter, FIG. 4). At the same input voltage, they can generate two output voltages with same control parameter value.

(2) They operate at near optimal operating conditions under both operating modes. The term "optimal" means that the converter will operate with high efficiency, or with low voltage or current stress.

For example, if the duty cycle of a boost converter is about 50%, it can be considered as optimal operating condition. However, if the duty cycle is about 90%, it cannot be considered as optimal operating condition because the voltage and current stress for the switches will be very high.

Similarly, if the switching frequency of an LLC converter is close to its resonant frequency, it can be considered as optimal operating condition. However, if the switching frequency of the LLC converter is much higher than the resonant frequency, such as two or three times the resonant frequency, it cannot be considered as optimal operating condition.

Also, for full-bridge PWM converter and full-bridge LLC converter, if all the MOSFETs are turned off all the time, the converter does not operate, and the output voltage and gain will be zero. This mode of operation is considered as zero-gain mode. For a boost converter, if the MOSFETs are turned off, the output voltage will equal to input voltage and the gain is one (1).

1.1 Sub-Line Frequency Modulation Control Strategy

Figure 1:
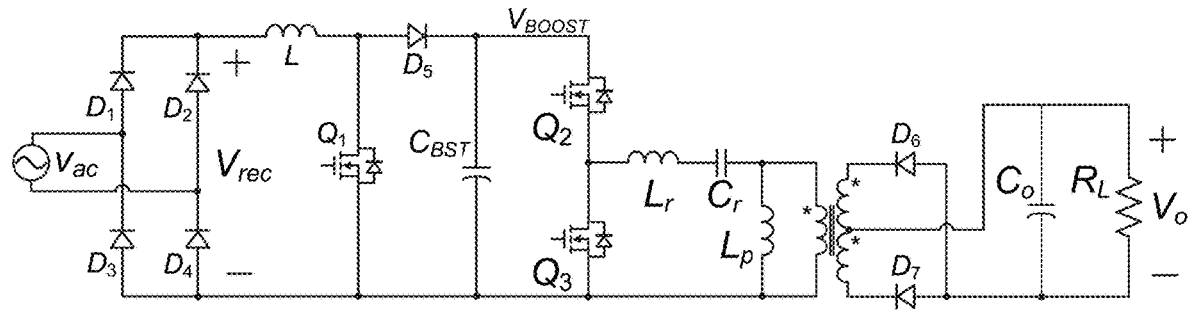
FIG. 1 is a circuit diagram of a boost converter followed by a LLC converter for an AC-DC power supply, according to the prior art.
Figure 5:
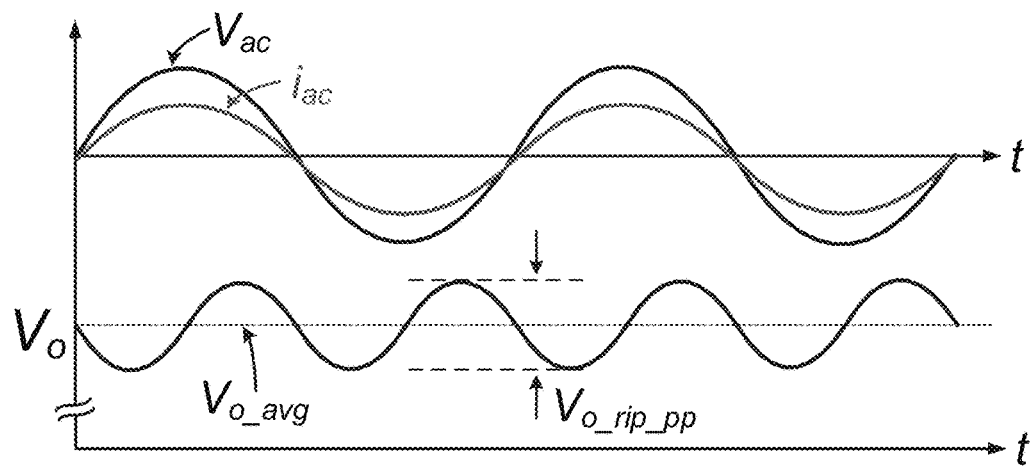
FIG. 5 is a plot of AC input voltage, AC input current, and output voltage waveforms of an AC to DC converter with power factor correction (PFC), according to the prior art.

For an AC-DC rectifier with Power Factor Correction (PFC), the AC input current follows the AC input voltage, in same phase and same shape, as shown in FIG. 5. Since the input power is changing over time and the output load draws constant power, an energy storage component is needed. The energy storage component is usually a large capacitor. For the boost converter as shown in FIG. 1, the energy storage capacitor is $C_{BST}$. Since $C_{BST}$ is usually very large, voltage across $C_{BST}$ is a DC value (Vo_avg) with a small low frequency voltage ripple (Vo_rip_pp). The ripple frequency is two times the line frequency (100 Hz or 120 Hz). The value of Vo_avg is much larger than the value of Vo_rip_pp. For example, Vo_avg may be about 400V and Vo_rip_pp may be about 10V to 20V. In order to (a) regulate the output voltage over wide range, and (b) remove the low frequency voltage ripple, a second stage DC-DC converter (the LLC converter as shown in FIG. 1) may be added. Since (a) the output voltage of the boost converter is always higher than the input peak AC voltage, and (b) the voltage gain variation of the LLC is normally limited, the output voltage variation range Vo as shown in FIG. 1, is limited.

Described herein is a control technology, referred to as Variable Gain Modulation control, to achieve very wide output voltage variation while maintaining desired, or optimal, operating conditions for the switching converter (also referred to as an AC-DC rectifier when the input is an AC voltage).

Features of Variable Gain Modulation include:
(1) A switching power converter that operates under two or more voltage gain modes, such as high-gain operating mode (with gain value of Gain_high) and low-gain operating mode (with gain value of Gain_low), is used to convert an AC voltage to a DC voltage. The switching converter may also achieve Power Factor Correction (PFC).

(2) An energy storage capacitor at the output of the switching power converter to maintain approximately DC voltage across the load.

(3) The switching power converter operates at optimal or near optimal conditions (such as high efficiency operation) for both high-gain mode and low-gain mode operation.

(4) The switching power converter may operate at high-gain mode and low-gain mode alternatively based on period of line cycle, such as 20 ms for 50 Hz system and 16.67 ms for 60 Hz system. For example, the converter may operate at high-gain mode for N_high AC line cycles followed by operating at low-gain mode for N_low AC line cycles (where N_high and N_low are integers), and then returns to high-gain operating mode.

(5) The output DC voltage contains a DC component and a low frequency ripple component. The frequency of the low frequency component depends on N_high and N_low, as well as the period of the AC voltage (T_line). For 50 Hz AC system, T_line=20 ms. If the converter operates at high-gain mode for two AC line cycles (N_high=2) and operates at low-gain mode for three AC line cycles (N_low=3), then the output voltage ripple will contain a low ripple frequency AC component with period of T_rip_low=2×20 ms+3×20 ms=100 ms. The low ripple frequency is F_rip_low=1/T_rip_low=10 Hz. Therefore, the output voltage ripple contains both low ripple frequency of 10 Hz and double line frequency ripple of 100 Hz.

(6) Since the converter produces lower output voltage at low-gain mode operation than at high-gain mode operation, it draws less power from the AC source operating at low-gain mode than operating at high-gain mode for the same input AC voltage. That is, the power drawn from the AC source is different under different operating modes (high-gain mode and low-gain mode) when input AC voltage is same.

(7) When the input AC voltage is same, the switching power converter may draw smaller AC sinusoidal current under low-gain mode operation, as compared with at high-gain mode operation. There may be varying AC sinusoidal current with varying peak values, corresponding to different operating modes.

(8) To achieve a wide output voltage variation range, the values of Gain_high and Gain_low may be significantly different. For example, if Gain_high is 2 times Gain_low, the output voltage may be varied by 2:1 ratio with same control parameter value. If Gain_high=1.1 times Gain_low, the output voltage may be varied by only 1.1:1 ratio, which is less desirable.

(9) In addition to high-gain and low-gain operation mode, a zero-gain operation mode may also be implemented. Zero-gain operation mode may be defined as the power converter uses substantially no power from the AC source and therefore the output voltage is substantially zero when the converter operates at zero-gain mode under steady state operation. When the converter does not switch, the output voltage is typically zero. However, a boost converter is an exception. With a boost converter, the output voltage substantially equals the peak value of the AC voltage when the boost switch is not switching. Under normal operating condition, the output voltage of the boost converter is higher than the input voltage. Therefore, if the boost switch (e.g., MOSFET) is not switching, the boost diode will be reverse biased, and no energy will be transferred from input to output.

(10) With zero-gain mode the switching power converter may operate under three modes to achieve a particular output voltage level. In the following description, zero-gain mode operation is not specifically emphasized since all the topologies can operate at zero-gain mode.

Figure 8:
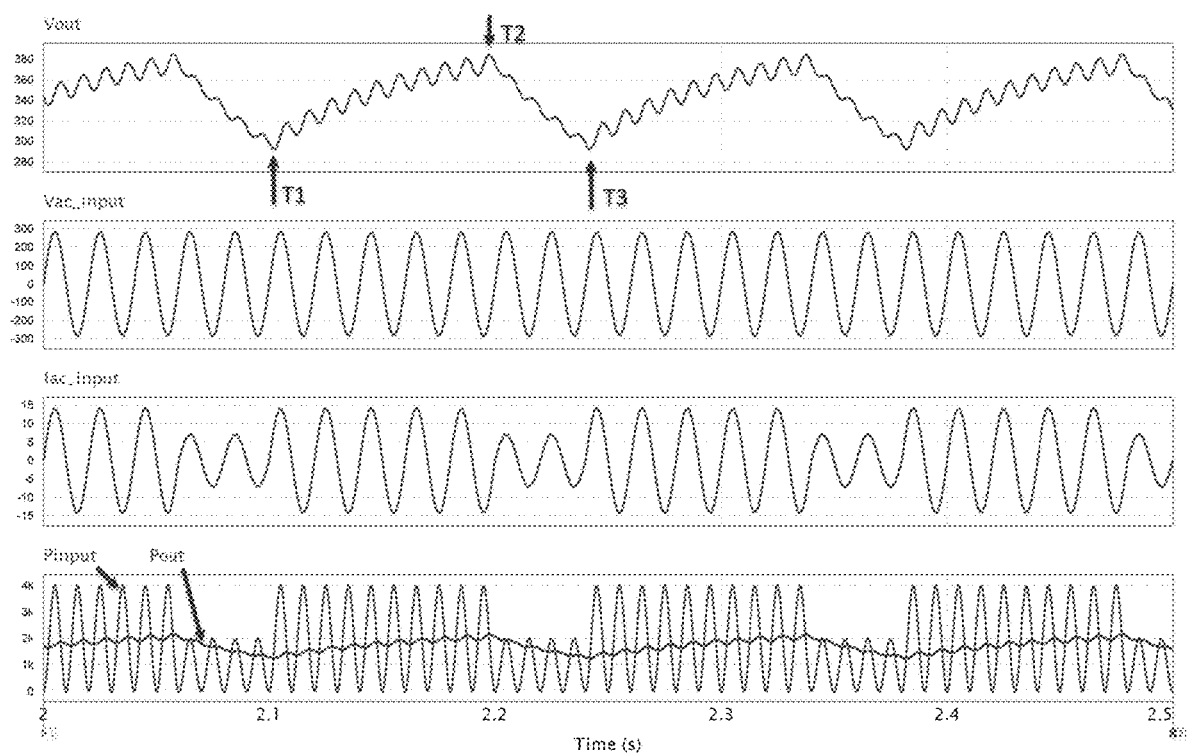
FIG. 8 shows simulation waveforms for sub-line frequency modulation, wherein N_high=5, N_low=2, Vo_avg=342.7V, Vo_rip_pp=92V, Pout=1,721 W, according to one embodiment.
Figure 9:
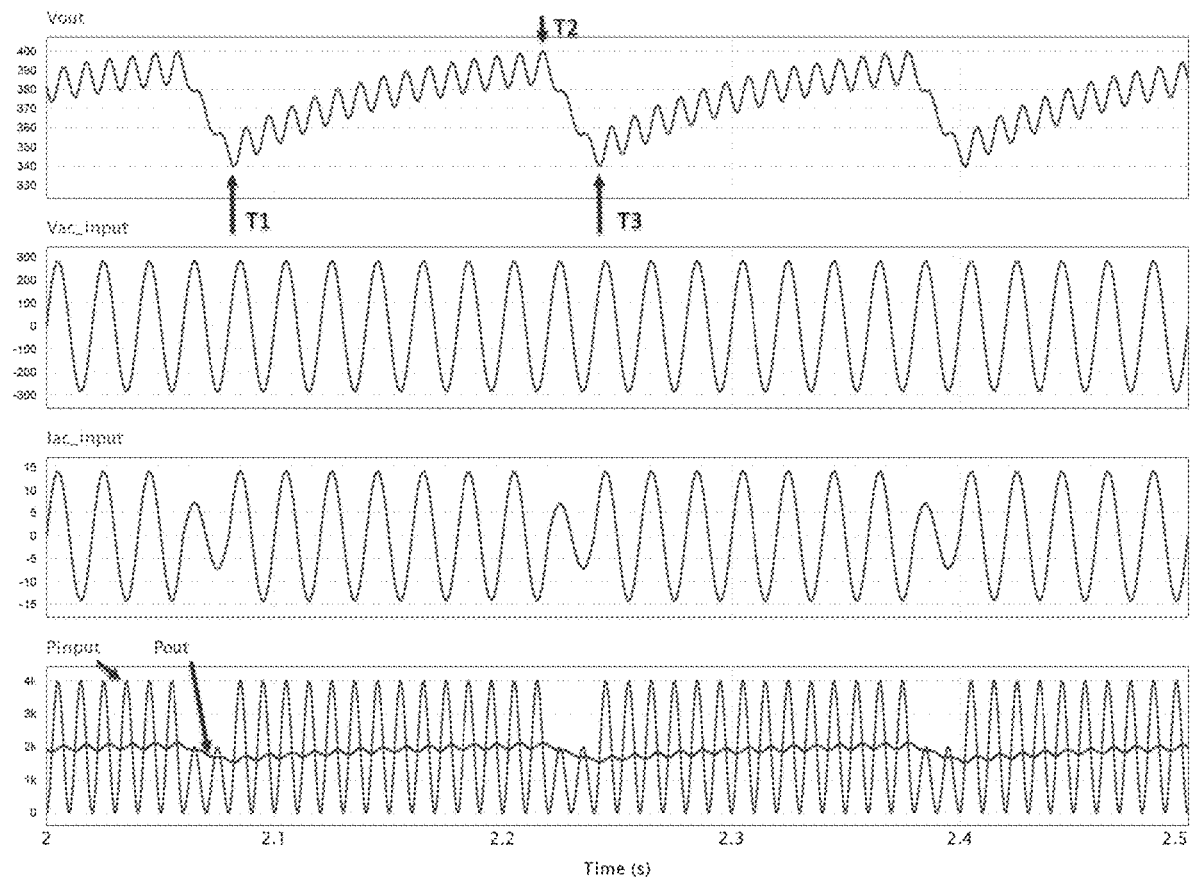
FIG. 9 shows simulation waveforms for sub-line frequency modulation with N_high=7, N_low=1, Vo_avg=375V, Vo_rip_pp=60V, Pout=1,876 W, according to one embodiment.

In some embodiments the time interval when the switching power converter operates at either high-gain mode or low-gain mode may be selected so that the output voltage is rising at high-gain mode operation and falling at low-gain mode operation, for example, such as shown in the simulation waveforms in FIG. 8 and FIG. 9.

1.2 Sub-Line Frequency Modulation Control Strategy

Figure 6:
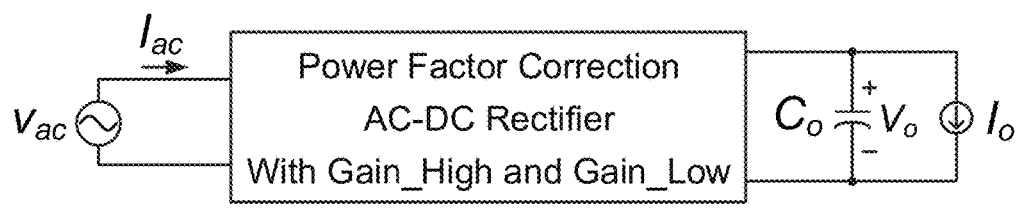
FIG. 6 is generalized circuit block diagram of an AC-DC rectifier with power factor correction showing the output hold up capacitor and constant current load, according to one embodiment.

FIG. 6 is a block diagram of an AC-DC rectifier with two voltage gains: Gain_high and Gain_low, with power factor correction (PFC), according to one embodiment. With PFC operation, a relatively large capacitor (Co as shown in FIG. 6) is used at the load so that the output voltage is substantially a DC voltage with a small low frequency ripple. For example, Co=1,000 uF is used in the analysis and simulation, although other values may of course be used. The value of the ripple voltage (Vo_rip_pp) is small as compared with its DC value (Vo_avg), normally less than about 20% of the DC value. The frequency of the ripple voltage is related to the line frequency.

In the following description of a control strategy, the below assumptions are made:

Assumption 1.1: An AC-DC rectifier with power factor correction has two operation modes: (1) high-gain operation mode and (2) low-gain operation mode.

Assumption 1.2: The voltage gain at high-gain operation mode (Gain_high) is two times the voltage gain at low-gain operation mode (Gain_low), Gain_high=2*Gain_low. For example, Gain_high=2 and Gain_low=1. The voltage gain is defined as a ratio of the output DC voltage value to the input AC rms value, as shown in equations (8) and (9) below.

Assumption 1.3: The input AC voltage does not change. In the analysis, as an example, Vac=200V rms and frequency of 50 Hz is used for illustration, and the converter operates at PFC mode.

Assumption 1.4: As an example, the maximum output voltage is 400V DC (200V rms*2) and the DC load current is 5 A, the maximum output power is 2,000 W.

Assumption 1.5: As an example, for different output voltage levels, load current is always at 5A.

Assumption 1.6: Switching frequency (e.g., normally in the range of 100-200 kHz) is much higher than the line frequency (50 Hz or 60 Hz) and the switching frequency ripple is neglected.

Assumption 1.7: The value of the output capacitor is large so that the low frequency ripple voltage across the output capacitor (same as the output voltage) is much smaller than its average value (or DC value).

It is noted that Gain_high is defined as the ratio of the output DC voltage (average voltage) to the rms value of the AC voltage when the AC-DC rectifier operates at high-gain mode. Gain_low is defined as the ratio of the output DC voltage (average voltage) to the rms value of the AC voltage when the AC-DC rectifier operates at low-gain mode. Therefore:

$$\text{Gain\_high}=Vo\_avg/Vac=2, \text{ at high-gain mode operation} \quad (8)$$

$$\text{Gain\_low}=Vo\_avg/Vac=1, \text{ at low-gain mode operation} \quad (9)$$

where Vac is the rms value of the input AC line voltage.

Figure 7A:
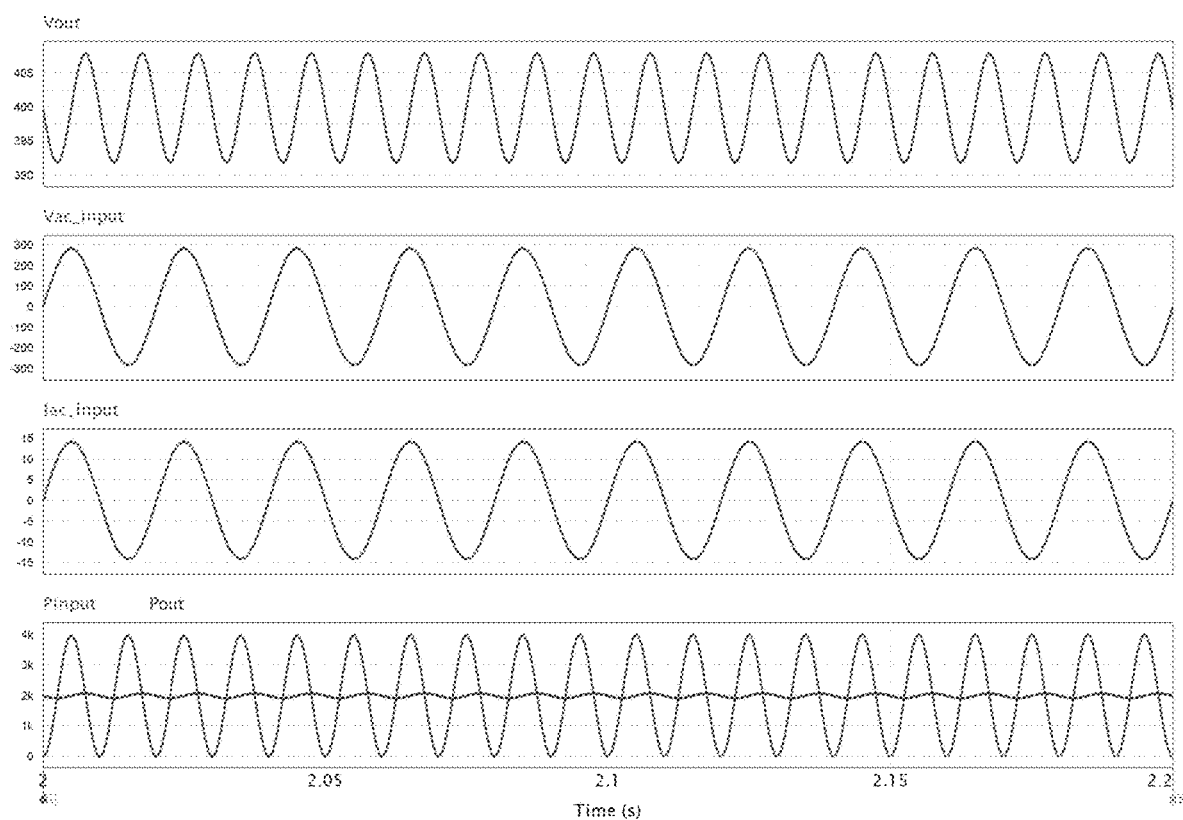
FIGS. 7A and 7B are simulation waveforms of an embodiment at normal operation at high-gain mode Vo_avg=400V, Vo_rip_pp=16V, Pout=2,000 W and at low gain mode, Vo_avg=200V, Vo_rip_pp=16V, Pout=1,000 W, respectively.

FIG. 7A shows simulation results when converter operates at high-gain mode all the time. Under this condition, the output voltage (top) is 400V. The average value is 400V and the low frequency ripple is about 16V peak to peak. The second waveform (from top) is the AC input voltage. The third waveform (from top) is the input AC current. The bottom waveforms are input power, Pinput, and output power, Pout. The input power is a sinusoidal shape. The output power is almost a DC value with small ripple.

Figure 7B:
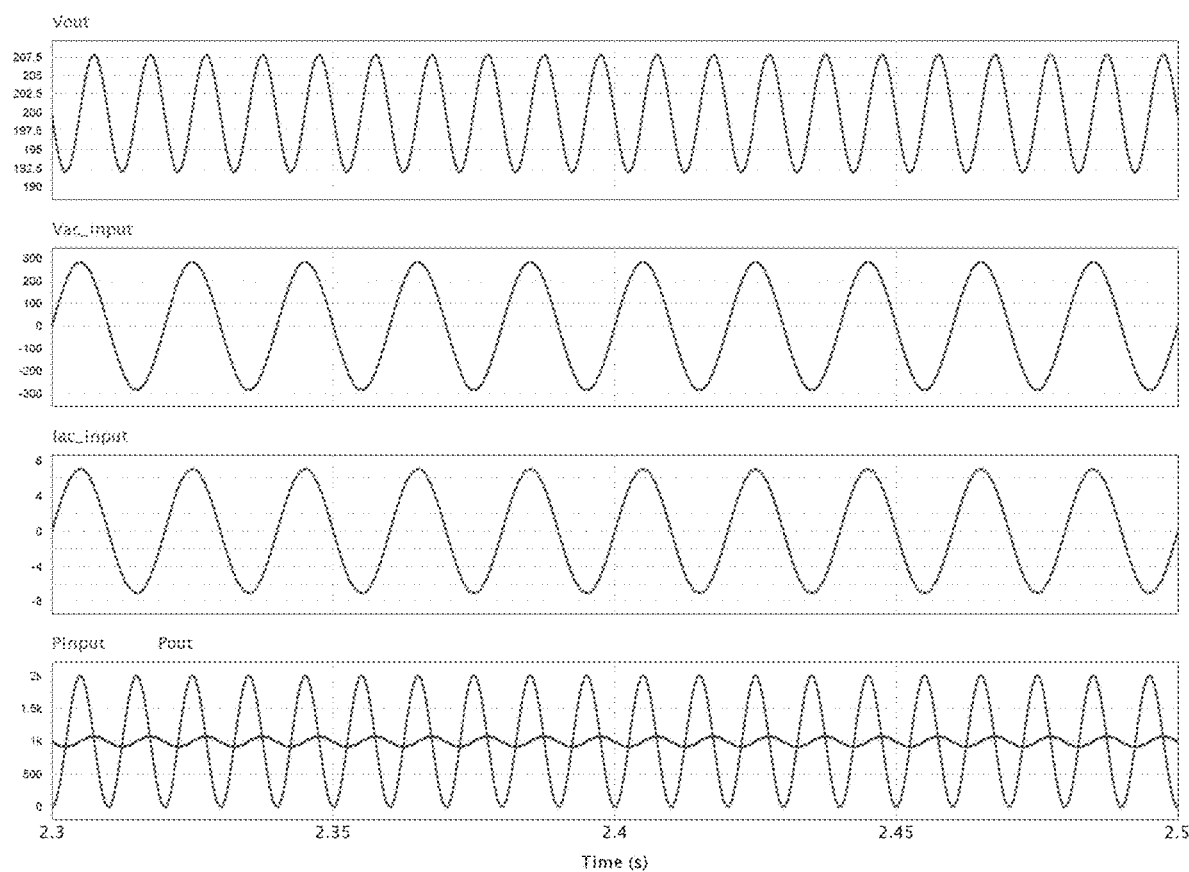

FIG. 7B shows simulation results when the converter operates at low-gain mode. At this condition, the output voltage (top) is 200V with low frequency ripple of about 16V peak to peak.

FIG. 8 shows simulation results under sub-line frequency modulation when N_high=5 and N_low=2. Under this condition, the converter operates at high-gain mode for five line-cycles and operates at low-gain mode for two line-cycles. With this control method, the average output voltage (top) is about 343V, and the peak-to-peak value of the low frequency ripple is Vo_rip_pp=92V. The output power is 1,721 W. From time T1 (T1=about 2.1 second) to time T2 (T2=about 2.2 seconds), the converter operates at high-gain mode and the output voltage rises. The input current is high during this period. From time T2 to T3 (T3=about 2.24 seconds), the converter operates at low-gain mode and the output voltage decreases. The time interval from T1 to T3 is 140 ms, which equates to (N_high+N_low)*T_line=(5+2)*20 ms=140 ms.

It is observed with sub-line frequency modulation, the average output voltage is reduced from 400V to 343V. The converter operates alternatively between high-gain mode and low-gain mode. The operating conditions of these two modes are optimal with high efficiency.

It is also noted that during high-gain mode operation, the input power is high (with peak value of 4,000 W). During low-gain mode operation, the input power is low (with peak value of 2,000 W).

Another observation is that with sub-line frequency modulation control, the output voltage does not reach steady state under either high-gain operation mode or low-gain operation mode. For example, at the end of the high-gain operation, at T2 (FIG. 8), the output voltage continues to increase if high-gain mode operation continues. Similarly, at the end of low-gain mode operation, at T3 (FIG. 8), the output voltage continues to decrease if low-gain mode continues. Since this is a low frequency change, or low frequency ripple, the low frequency ripple may be removed using another DC-DC converter as a second stage.

It is noted that the sub-line frequency modulation will change the DC value of the output voltage of a converter with power factor correction. It will not remove the low frequency ripple voltage of the converter. Another DC-DC converter will be needed to remove the low frequency ripple voltage to produce a pure DC voltage.

FIG. 9 shows simulation results of sub-line frequency modulation at N_high=7 (high-gain mode operation for seven line cycles) and N_low=1 (low-gain operation for one line cycle). In this case, Vo_avg=375V, Vo_rip_pp=60V and output power is Pout=1,876 W.

Figure 10:
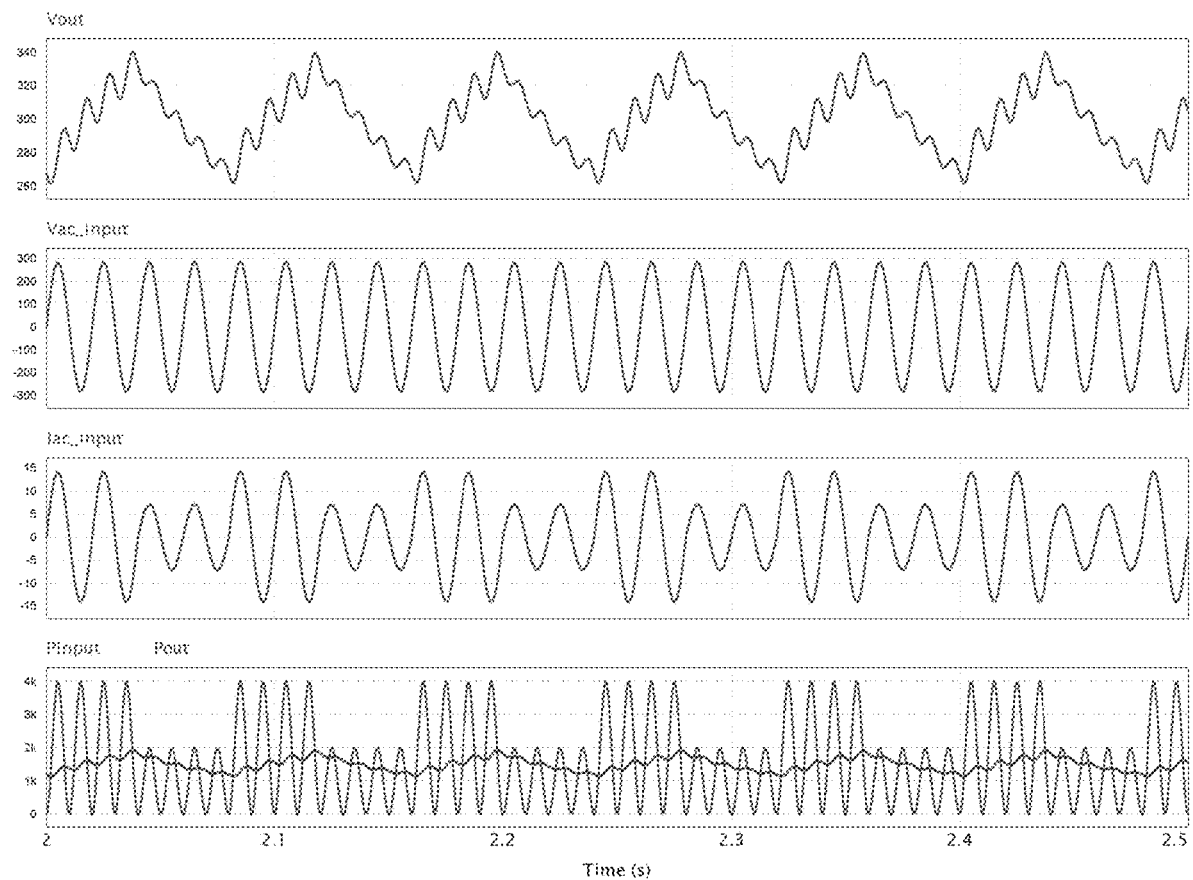
FIG. 10 shows simulation waveforms for sub-line frequency modulation with N_high=2, N_low=2, Vo_avg=300V, Vo_rip_pp=78V, Pout=1,500 W, according to one embodiment.

FIG. 10 shows simulation results of sub-line frequency modulation at N_high=2 (high-gain mode operation for two line cycles) and N_low=2 (low-gain mode operation for two line cycles). In this case, Vo_avg=300V, Vo_rip_pp=78V and output power is Pout=1,500 W.

Figure 11:
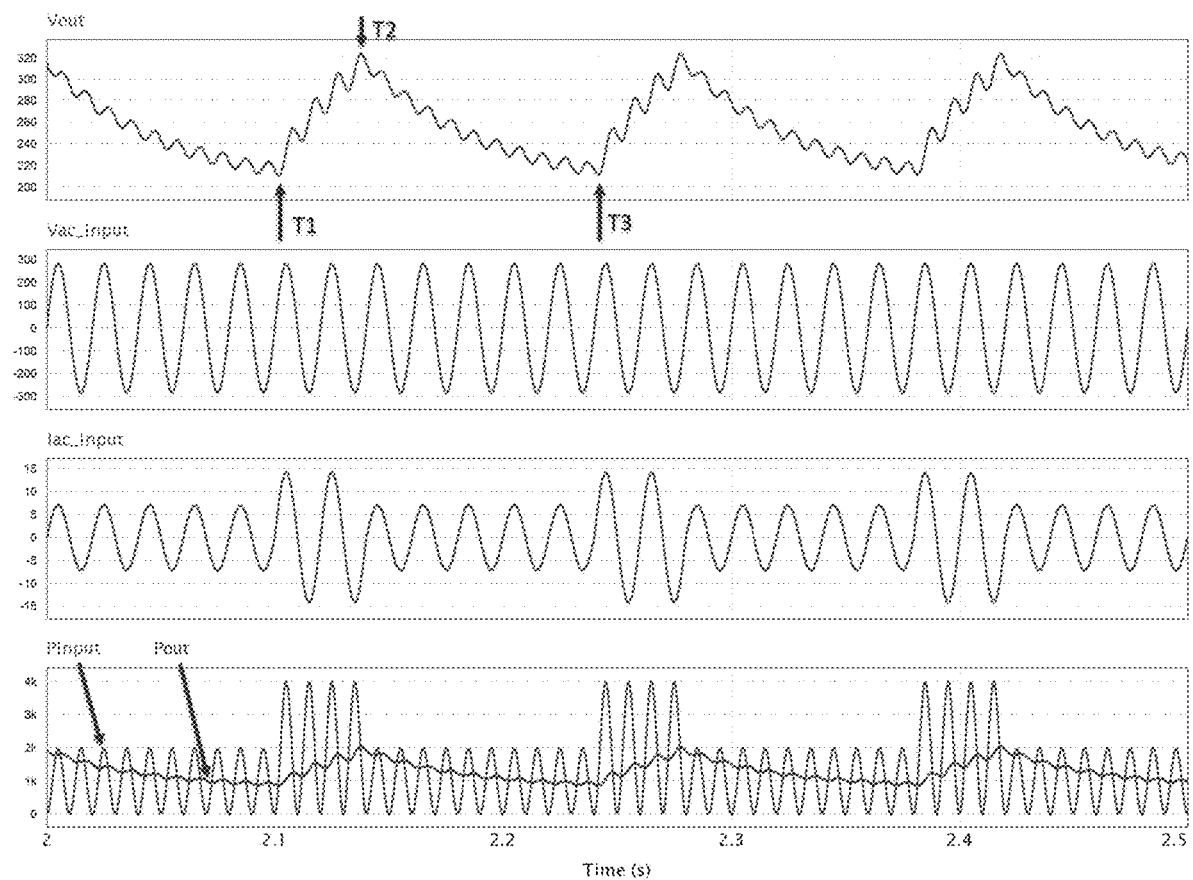
FIG. 11 shows simulation waveforms for sub-line frequency modulation with N_high=2, N_low=5, Vo_avg=257V, Vo_rip_pp=112V, Pout=1,302 W, according to one embodiment.

FIG. 11 shows simulation results of sub-line frequency modulation at N_high=2 (high-gain mode operation for two line cycles) and N_low=5 (low-gain mode operation for five line cycles). In this case, Vo_avg=257V, Vo_rip_pp=112V and output power is Pout=1,302 W.

From the above analysis, it has been demonstrated that by changing the number of AC line cycles of high-gain mode operation (N_high) and low-gain mode operation (N_low), the output voltage of the AC-DC rectifier can be changed by sub-line cycle operation. The term "sub-line cycle" refers to the fact that the control period is an integer number times the AC line period. In the cases shown in FIGS. 8 and 11, the control period is 7 times (N_high+N_low=7) the line period. In the case shown in FIG. 9, the control period is 8 times the line period. In the case shown in FIG. 10, the control period is 4 times the line period. Another low frequency ripple, which is lower than the line frequency, is generated.

1.3 Continuous Adjustment of Output Voltage DC Value

In the above analysis (1) the gain value of high-gain mode operation (Gain_high) and low-gain mode operation (Gain_low) is fixed, and (2) the number of AC line cycles for high-gain mode operation (N_high) and for low-gain mode operation (N_low) are integer values. Therefore, the DC output voltage value will be a discrete value. Under these conditions the DC output voltage value cannot be adjusted continuously.

In a practical implementation the optimal operation, such as high efficiency mode operation, will be maintained over a limited range of gain values. For example, with an LLC converter, the high efficiency mode operation may be maintained for a voltage gain range of 1.8 to 2.2, or a variation of ±10%. Therefore, the DC value of the output voltage of the converter may be regulated accurately to a desired value by changing the actual gain of the converter.

Figure 12:
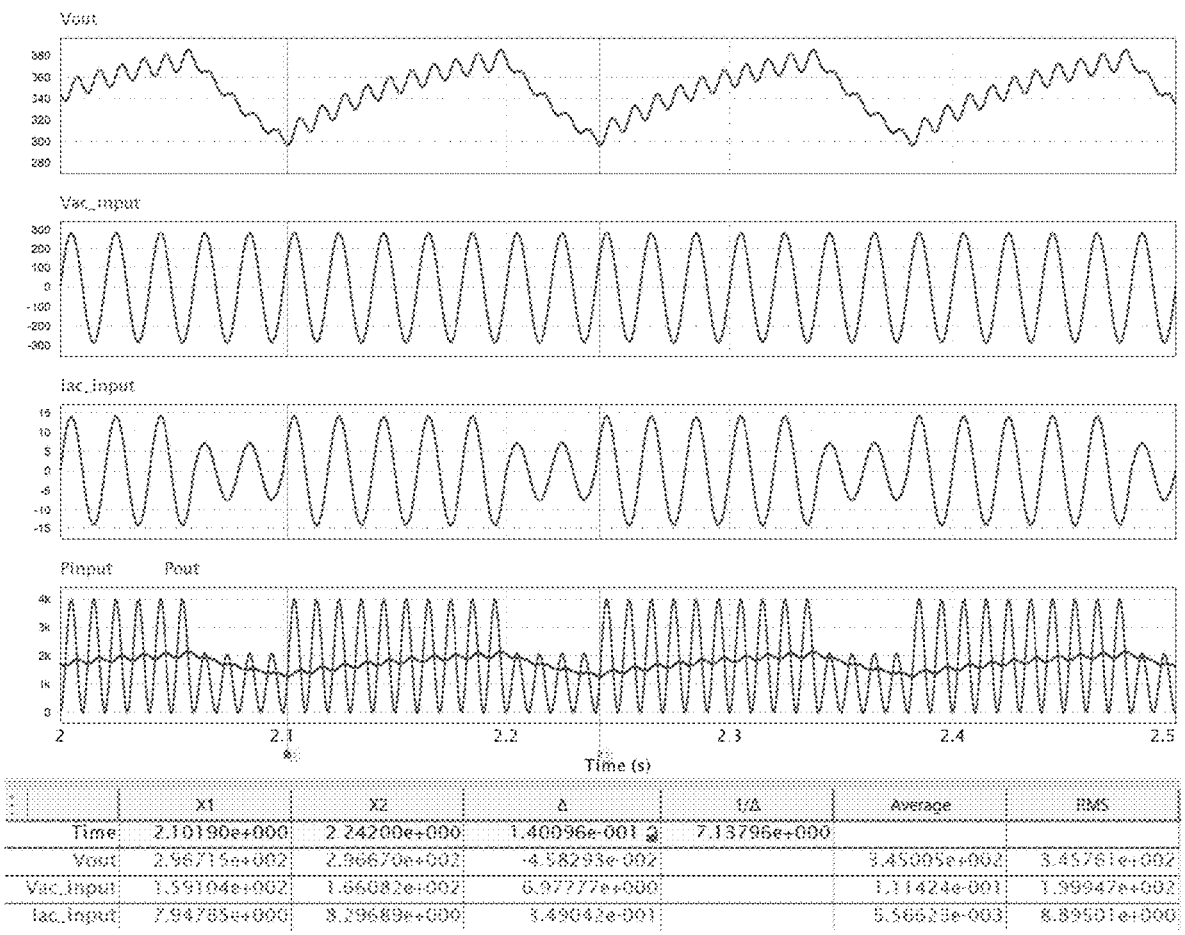
FIG. 12 shows simulation waveforms for sub-line frequency modulation with N_high=5, N_low=2, and Gain_high=2, Gain_low=1.04, Vo_avg=345V, Vo_rip_pp=88.8V, Pout=1,732 W, according to one embodiment.

For example, FIG. 12 shows simulation results when N_high=5, N_low=2, Gain_high=2, and Gain_low=1.04. In this case, the DC value of the output voltage is 345V, which is slightly higher than 342.7V when N_high=5, N_low=2, Gain_high=2 and Gain_low=1, as shown in FIG. 8.

Since the gain value of the AC to DC switching converter can be adjusted continuously, the DC value of the output voltage can also be regulated to any desired value. This may be achieved by, e.g., feedback control. In the case of PWM converter embodiments, the gain may be adjusted by changing the duty cycle. In the case of resonant converter embodiments, the gain may be adjusted by changing the switching frequency.

Similarly, the gain value under high-gain mode operation (Gain_high) may also be adjusted to achieve accurate output voltage regulation. The details are not presented here.

Therefore, the output voltage of the converter may be regulated based on the following relationship:
(1) Larger N_high value will increase the output voltage.
(2) Larger N_low value will decrease the output voltage.
(3) Larger Gain_high will increase the output voltage.
(4) Larger Gain_low will increase the output voltage.
(5) Higher N_high/N_low ratio will increase the output voltage.

All four parameters, N_high, N_low, Gain_high, and Gain_low, may be used to control the output voltage. Examples of strategies to achieve desirable combinations are outlined below.
(1) To reduce the low frequency output voltage ripple, smaller N_high and N_low values may be used.
(2) To maintain a selected operating condition, such as high efficiency, the parameters of the converter may be selected in such a way that the voltage gain variation is limited for either high-gain mode operation (such as from 1.8 to 2.2), or for low-gain mode operation (such as from 0.9 to 1.1). A wide variation of the DC output voltage level may be achieved by sub-line frequency modulation operation.

As an example for point (1) above, an operation mode of N_high=5 and N_low=5 (mode A) will produce the same DC value of the output voltage as an operation mode of N_high=1 and N_low=1 (mode B). With mode A, the period of low frequency ripple will be 10 times (5+5) the line period, which is T_rip_low=(5+5)×20 ms=200 ms for 50 Hz AC system. With mode B, the period of the low frequency ripple is 2 times (1+1) the line frequency, which is T_rip_low=(1+1)×20 ms=40 ms. Therefore, the output voltage ripple is smaller for mode B operation, which is desirable.

With respect to point (2) above, it is generally observed that the wider the voltage gain required, the more design penalty will be imposed to the converter. Therefore, the converter will achieve worse performance. For example, consider two designs using an LLC converter. Design LLC_A requires voltage gain variation of 2 to 3, and design LLC_B requires voltage gain variation of 2 to 2.2, while all other requirements are the same. Design LLC_B will achieve better performance, such as higher efficiency, than design LLC_A. Accordingly, design LLC_B will be preferred.

Therefore, with sub-line frequency modulation technology, the converter operates at different gain modes and wide output voltage variation range can be achieved, while the gain variation for the converter itself is small.

1.4 Sub-Double-Line Frequency Modulation

In order to reduce the low frequency output voltage ripple, the sub-line frequency modulation may be extended to sub-double-line frequency modulation. In this case, the high-gain mode operation and low-gain mode operation may be decided based on half period of AC line cycles, such as 10 ms for 50 Hz system and 8.33 ms for 60 Hz system. For example, the converter operates alternatively between high-gain mode for N_half_high half AC line cycles and low-gain mode for N_half_low half AC line cycles (where N_half_high and N_half_low are integers), and then the converter returns to high-gain operating mode again. For example, assuming 50 Hz AC line, the converter operates at high-gain mode for 3 half line cycle, or for 3×10 ms=30 ms, and then operates at low-gain mode for 2 half line cycles, or for 2×10 ms=20 ms.

A difference between sub-line frequency modulation and sub-double-line frequency modulation is the minimum time interval. With sub-double-line frequency modulation, the minimum interval is half the line period. For 50 Hz AC system, the minimum interval is 10 ms. For 60 Hz AC system, the minimum interval is 8.33 ms.

Figure 13:
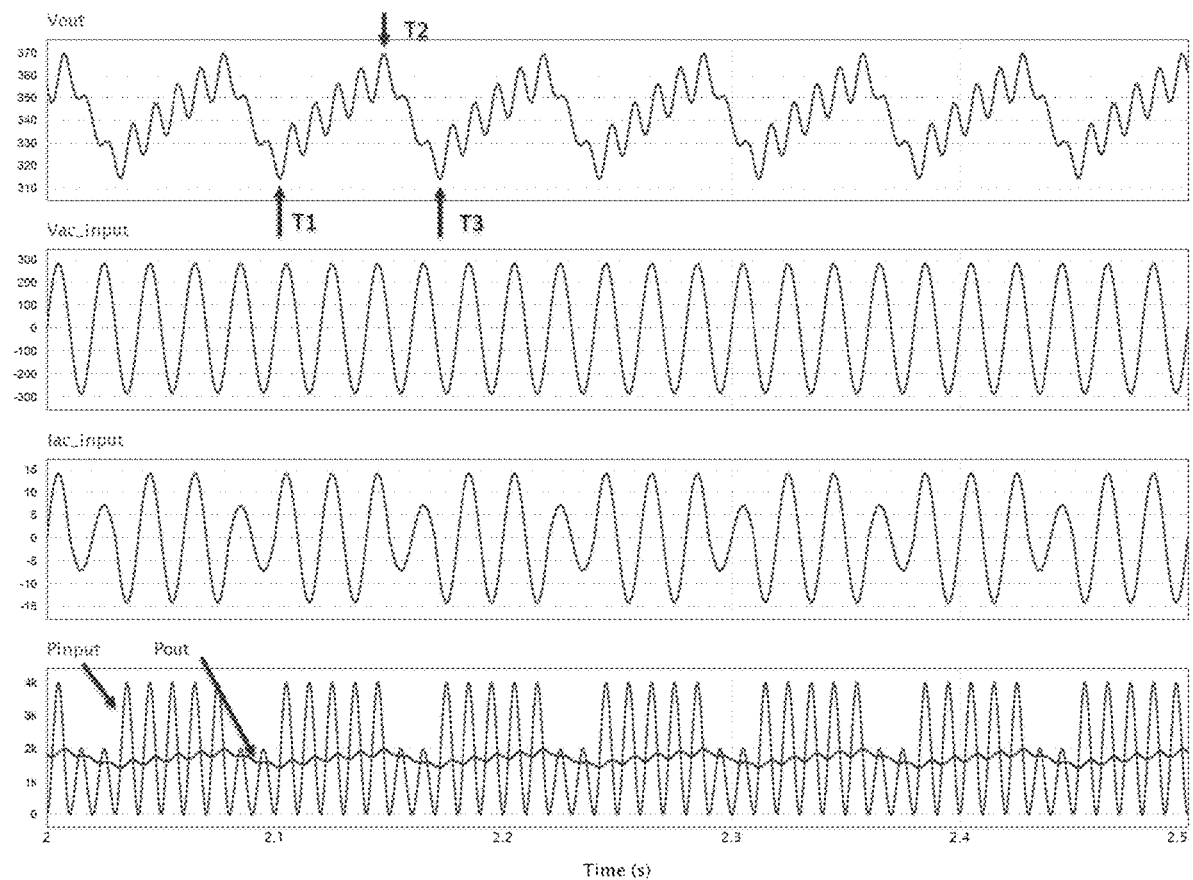
FIG. 13 shows simulation waveforms for sub-double line frequency modulation, N_half_high=5, N_half_low=2, Vo_avg=342.7V, Vo_rip_pp=55V, and Pout=1,716 W, according to one embodiment.

FIG. 13 shows simulation results under the sub-double-line frequency modulation when N_half_high=5 and N_half_low=2. Under this condition, the converter operates at high-gain mode for five (5) half line-cycles (5×10 ms=50 ms) and operates at low-gain mode for two (2) half line-cycles (2×10 ms=20 ms). With this control method, the average output voltage is about 342.7V, and the peak-to-peak value of the low frequency ripple is Vo_rip_pp=55V. The output power is 1,717 W. From time T1 (T1=about 2.1 second) to time T2 (T2=about 2.15 second), the converter operates at high-gain mode and the output voltage rises. The input current is high during this period. From time T2 to T3 (T3=about 2.17 second), the converter operates at low-gain mode and the output voltage falls. The time interval from T1 to T3 is 70 ms, which equates to (N_half_high+N_half_low)

*T_half_line=(5+2)*10 ms=70 ms. T_half_line is the half line period. T_half_line=T_line/2=10 ms.

The following may be observed by comparing the simulation results shown in FIG. 8 and FIG. 13:
(1) The DC output voltage value is substantially the same. This is because the relative proportion of the high-gain mode operation and low-gain mode operation is the same.
(2) The ripple voltage for FIG. 13 is 55V, (Vo_rip_pp=55V), while the ripple voltage for FIG. 8 is 92V (Vo_rip_pp=92V). The ripple is reduced by approximately one-half with sub-double-line frequency modulation.
(3) The low frequency ripple period is 70 ms for sub-double-line frequency modulation (FIG. 13) and 140 ms for sub-line frequency modulation (FIG. 8).

Figure 14:
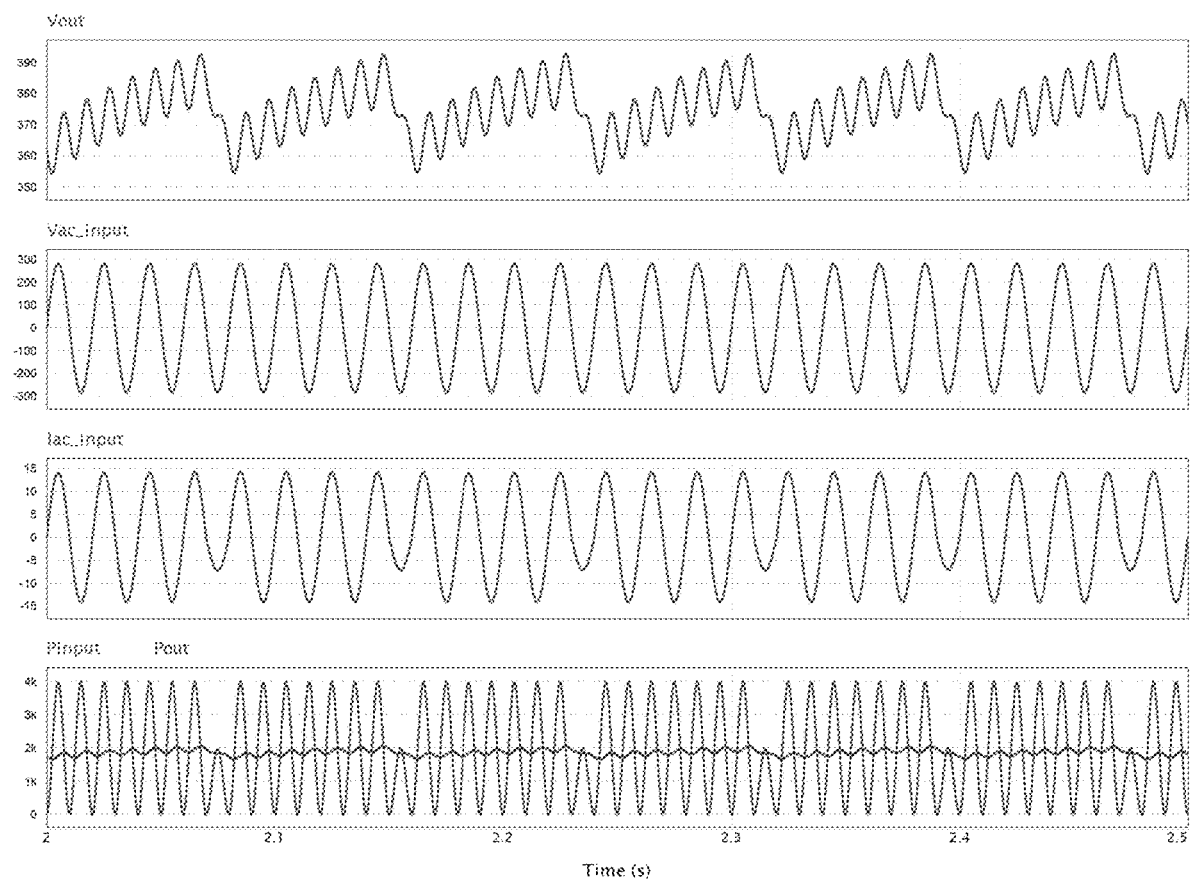
FIG. 14 shows simulation waveforms for sub-double line frequency modulation, N_half_high=7, N_half_low=1, Vo_avg=375V, Vo_rip_pp=38V, and Pout=1,875 W, according to one embodiment.

FIG. 14 shows simulation results of sub-double-line frequency modulation at N_half_high=7 (high-gain mode operation for seven half line-cycles, 7×10 ms=70 ms) and N_half_low=1 (low-gain operation for one half line cycle, 1×10 ms=10 ms). In this case, Vo_avg=375V, Vo_rip_pp=38V and output power is Pout=1,875 W.

Figure 15:
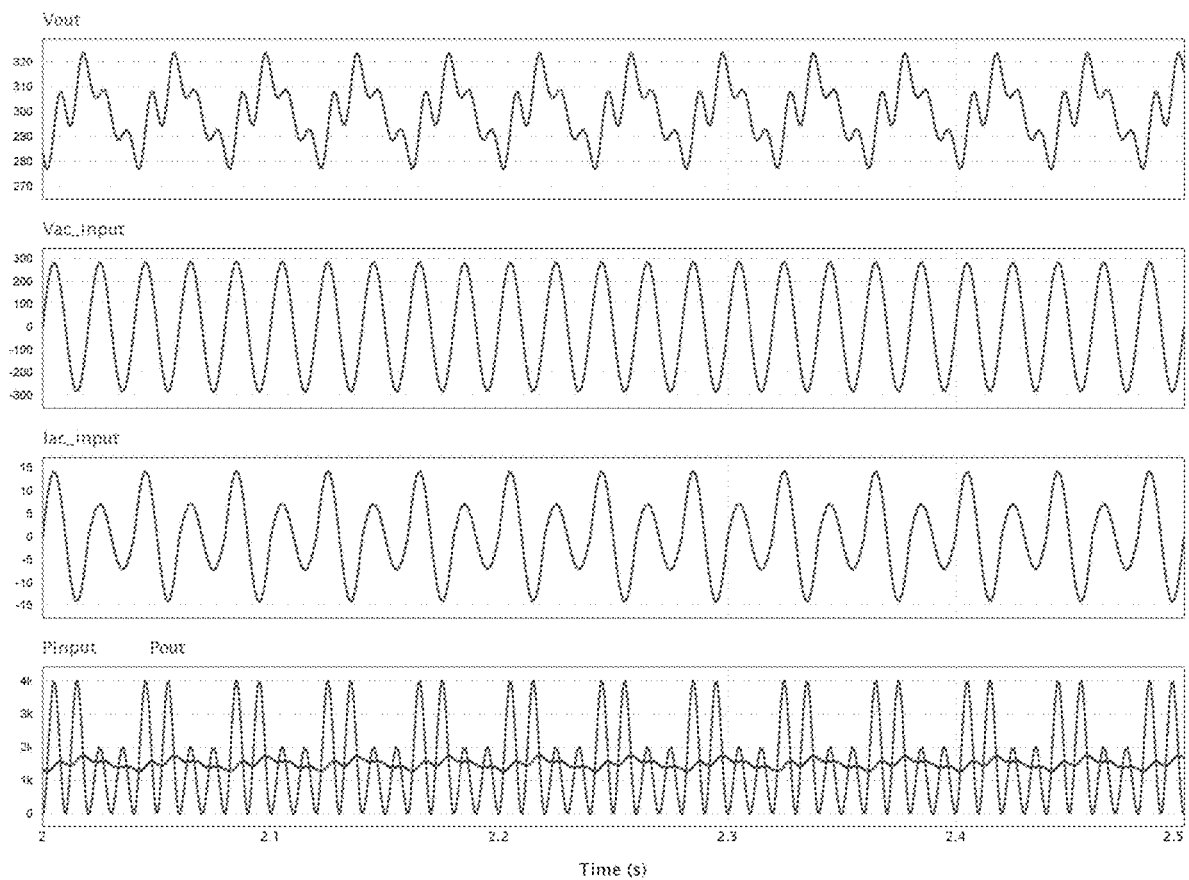
FIG. 15 shows simulation waveforms for sub-double line frequency modulation, N_half_high=2, N_half_low=2, Vo_avg=300V, Vo_rip_pp=38V, and Pout=1,502 W, according to one embodiment.

FIG. 15 shows simulation results of sub-double-line frequency modulation at N_half_high=2 (high-gain mode operation for two half line-cycles, 2×10 ms=20 ms) and N_half_low=2 (low-gain mode operation for two half line-cycles, 2×10 ms=20 ms). In this case, Vo_avg=300V, Vo_rip_pp=38V and output power is Pout=1,500 W.

Figure 16:
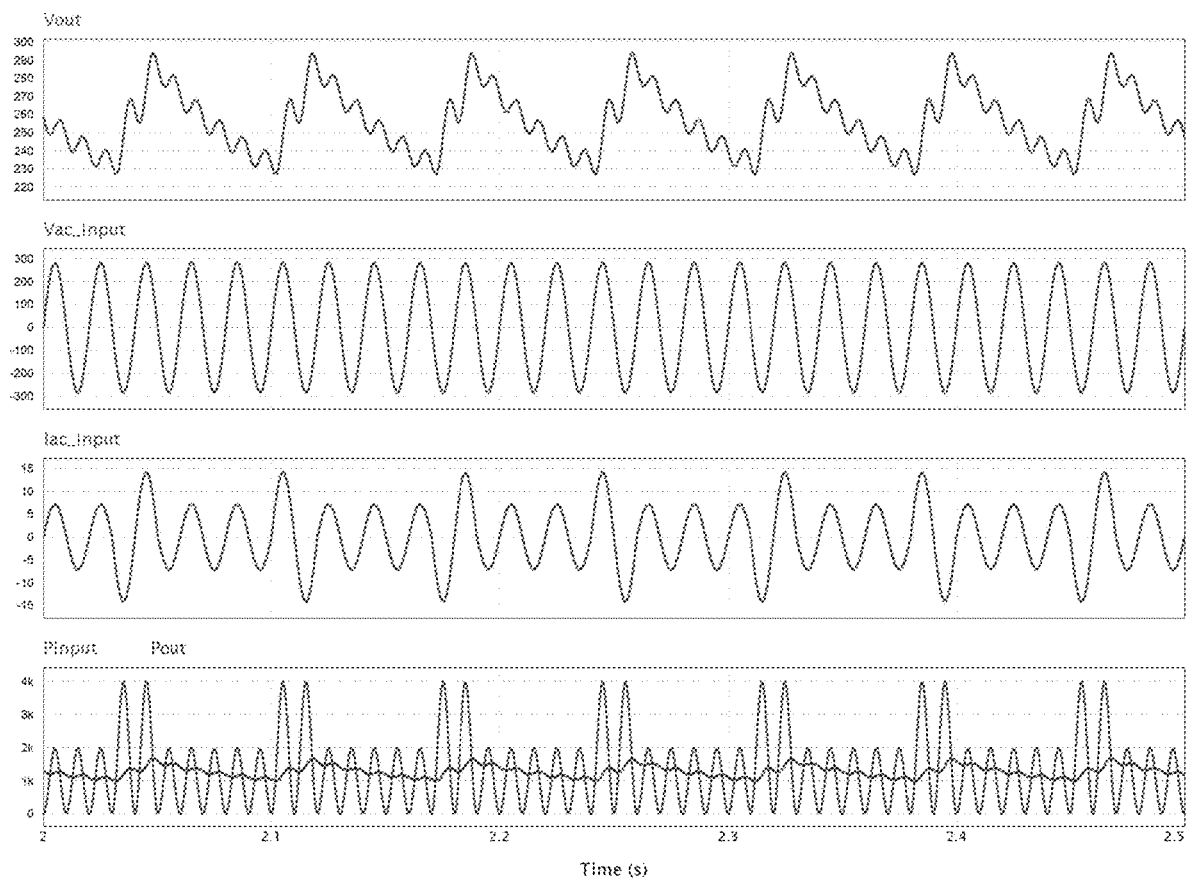
FIG. 16 shows simulation waveforms for sub-double line frequency modulation, N_half_high=2, N_half_low=5, Vo_avg=275V, Vo_rip_pp=66V, and Pout=1,290 W, according to one embodiment.

FIG. 16 shows simulation results of sub-double-line frequency modulation at N_half_high=2 (high-gain mode operation for two half line-cycles, 2×10 ms=20 ms) and N_half_low=5 (low-gain mode operation for five half line-cycles, 5×10 ms=70 ms). In this case, Vo_avg=257V, Vo_rip_pp=66V and output power is Pout=1,290 W.

Comparing the simulation results of FIGS. 8 and 13, FIGS. 9 and 14, FIGS. 10 and 15, and FIGS. 11 and 16, it can be observed that sub-double-line frequency modulation has features of the sub-line frequency modulation method, while achieving much smaller (almost reduced by half) low frequency ripple voltage. Therefore, sub-double-line frequency modulation method may be a preferred implementation method. In the rest of this description, only sub-double-line frequency modulation will be discussed.

It is also noted that in the above analysis, the switch-over between high-gain mode operation and low-gain mode operation happens at zero crossing point of the AC input voltage. However, the switch-over can happen at any AC input voltage. One benefit of switch-over at zero crossing point is that the transition will be smooth for high-gain mode operation and low-gain mode operation. Therefore, it may be advantageous to have switch-over at zero crossing point during steady state operation. During transient operation, it may be advantageous to have the switch-over when the instantaneous input voltage is not zero to improve the transient performance.

The consideration for selecting control parameters, such as N_half_high, N_half_low, Gain_high, and Gain_low, will be same for sub-double-line frequency modulation and for sub-line frequency modulation.

1.5 Extension to Output Voltage Lower than the Value Achieved by the Low-Gain Mode The above analysis assumes a high-gain value of 2 and low-gain value of 1 and assumes the input voltage is 200V rms. Therefore, the steady state output voltage would be 400V (200V*2) for high-gain mode operation and 200V (200V*1) for low-gain mode operation. With the sub-line frequency modulation and sub-double-line frequency modulation, the output voltage may be regulated between 200V and 400V, or between the steady state output voltage values of the high-gain mode operation and low-gain mode operation.

If the desired output voltage is below 200V, such as 150V, a zero-gain operation mode may be introduced and the converter operates between low-gain mode and zero-gain mode. Under zero-gain mode, the steady state output voltage will be zero.

In the above example, if the output voltage of the converter is required to be regulated at about 150V, while the output of the converter is 200V at low-gain operation, then one possible operation is as following:

(1) The converter operates at low-gain mode for N_low line cycles, or N_half_low half-line cycles;
(2) The converter then operates at zero-gain mode for N_zero line cycles, or N_half_zero half-line cycles;
(3) The converter repeats the above operations.

N_zero is the number of AC line cycles when the converter operates at zero-gain operation mode. When there is no energy transfer from input to output, the output voltage will be zero in steady state. N_half_zero is the number of AC half-line cycles when the AC-DC rectifier operates at zero-gain mode.

In the above example and control strategy, the output voltage of the AC-DC rectifier may be regulated at about 150V. The following are noted:

(1) Smaller value of N_low and N_zero are used to reduce the low frequency ripple of the output voltage.
(2) When different N_low and N_zero are used, the output voltage may be regulated between 0V and 200V.
(3) Sub-double-line frequency modulation may also be used. In this case, the converter operates at low-gain mode for N_half_low half-line cycles and N_half_zero half-line cycles.
(4) The number of N_low, N_zero and N_half_low, N_half_zero may be small enough so that the output voltage of the AC-DC rectifier is a DC value (Vo_avg) with a low frequency ripple (Vo_rip_pp). For example, the values may be selected to maintain Vo_rip_pp less than 10% to 50% of the Vo_avg.

Figure 17:
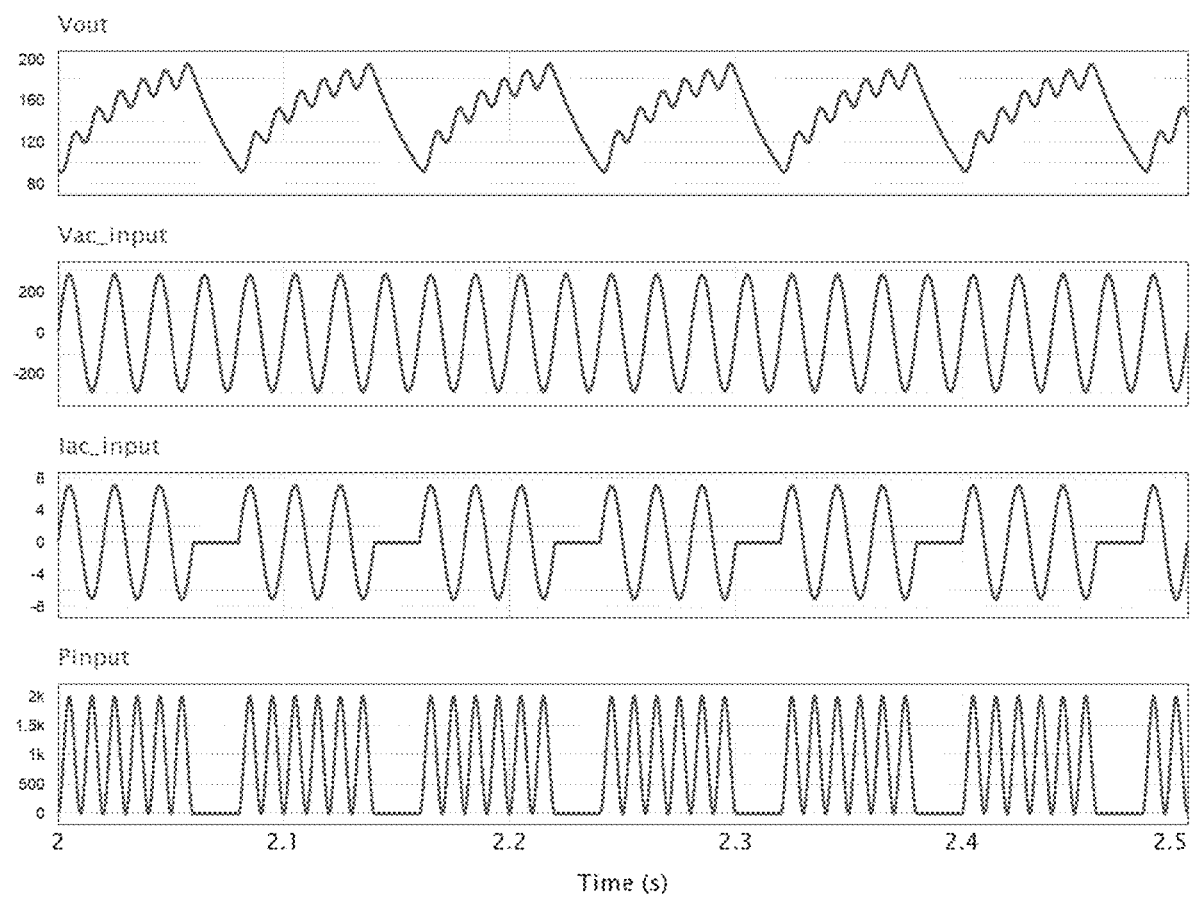
FIG. 17 shows simulation waveforms for sub-line frequency modulation, N_half_low=6, N_half_zero=2, Vo_avg=150V, Vo_rip_pp=55V, and Pin_avg=750 W, according to one embodiment.

FIG. 17 shows simulation results when Vac=200V, N_half_low=6, N_half_zero=2. With this operating condition, the output voltage is Vo_avg=150V. The peak-to-peak value of the low frequency ripple is 55V.

2 Control Strategy for Input Voltage Variation

The above analysis shows that the output voltage may be changed by Variable Gain Modulation method (sub-line frequency modulation and sub-double-line frequency modulation). This section shows that the output voltage may be maintained at approximately the same value when the input voltage changes over wide range.

The following assumptions are made in the below analysis:

Assumption 2.1: A converter with power factor correction has two operation modes: (1) high-gain operation mode and (2) low-gain operation mode.

Assumption 2.2: The voltage gain at high-gain operation mode (Gain_high) is two times the voltage gain at low-gain operation mode (Gain_low), Gain_high=2*Gain_low, for example, it is assumed that Gain_high=2 and Gain_low=1. It is noted that the gain is defined as Vo_avg/Vac.

Assumption 2.3: The input AC voltage will change between Vac1=100 Vrms and Vac2=200 Vrms, a 2:1 change ratio. In the analysis, an AC line frequency of 50 Hz is used for illustration purposes. The AC-DC rectifier operates at PFC mode.

Assumption 2.4: The output voltage is regulated at 150V DC and the DC load current is 5 A over the above input voltage variation (between 100 Vrms and 200 Vrms). Therefore, the output power is 750 W. The load resistor is 300.

Assumption 2.5: For different input voltage levels, load current is always 5 A.

Assumption 2.6: Switching frequency (normally in the range of 100-500 kHz) is much higher than the line frequency (50 Hz or 60 Hz) and the switching frequency ripple is neglected.

Assumption 2.7: Sub-Double-Line frequency modulation is used. The operation for Sub-Line frequency modulation will be same.

As an example, the average value of the output voltage is regulated at 150V when the input AC voltage changes from 100V to 200V.

Figure 18:
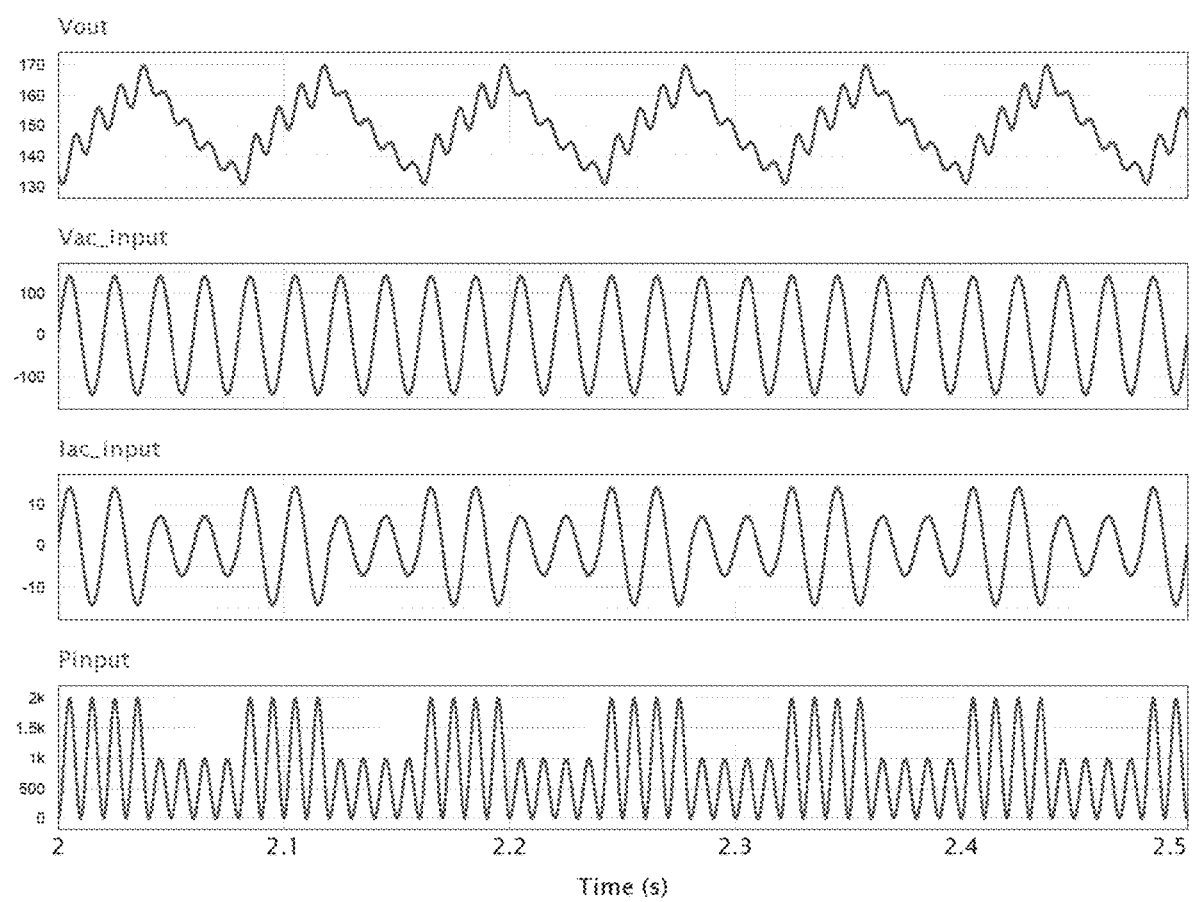
FIG. 18 shows simulation waveforms for sub-double-Line frequency modulation, N_half_high=4, N_half_low=4, Vin=100V, Vo_avg=150V, Vo_rip_pp=39V, Pin_avg=750 W, and R_load=300, according to one embodiment.

When the input AC voltage is 100V, FIG. 18 the simulated waveforms show that when the converter operates at high-gain mode (Gain_high=2) for 4 half line cycles (N_half_high=4, or 4*10 ms=40 ms) followed by operating at low-gain mode (Gain_low=1) for the next 4 half line cycles (N_half_low=4, or 4*10 ms=40 ms), the output voltage may be regulated at 150V. If the converter operates at high-gain mode for long time, such as 10 to 50 line cycles, the output voltage will be at 2×100=200V. On the other hand, if the converter operates at low-gain mode for long time, the output voltage will be 1×100=100V. Therefore, by operating between high-gain mode and low-gain mode, the output voltage can be regulated at 150V.

Figure 19:
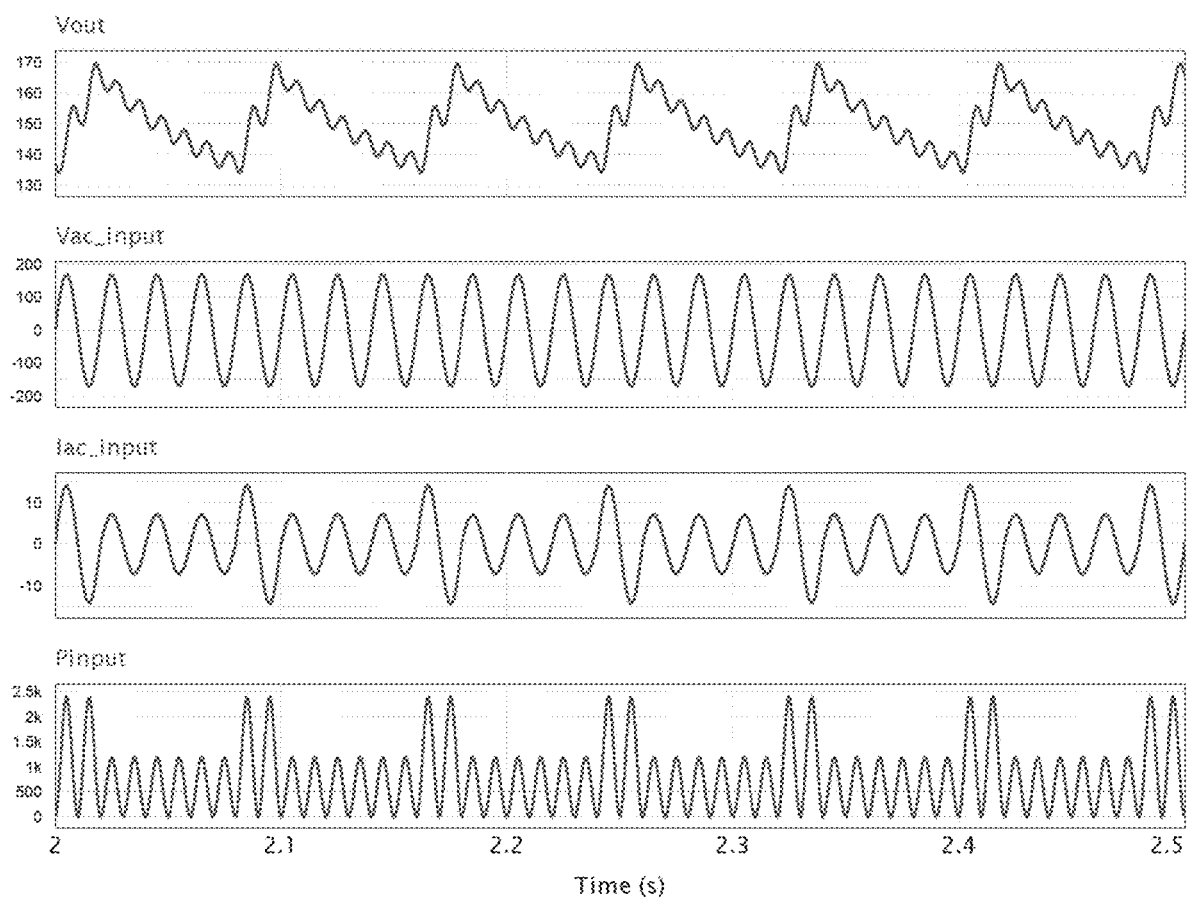
FIG. 19 shows simulation waveforms for sub-double-line frequency modulation, wherein N_half_high=2, N_half_low=6, Vin=120V, Vo_avg=150V, Vo_rip_pp=35V, Pin_avg=750 W, and R_load=300, according to one embodiment.

When the input AC voltage changes to 120V, the steady-state value of the output voltage regulation range is 120V (at low-gain mode operation) and 120V×2=240V (at high-gain mode operation). FIG. 19 shows simulated operation waveforms. In this case, the converter operates at high-gain mode for 2 half line cycles, N_half_high=2, and operates at low-gain mode for 6 half line cycles, N_half_low=6. The average value of the output voltage is regulated at 150V.

When the input AC voltage is 150V, then the converter operates at low-gain mode all the time and the average value of the output voltage will always be 150V.

Figure 20:
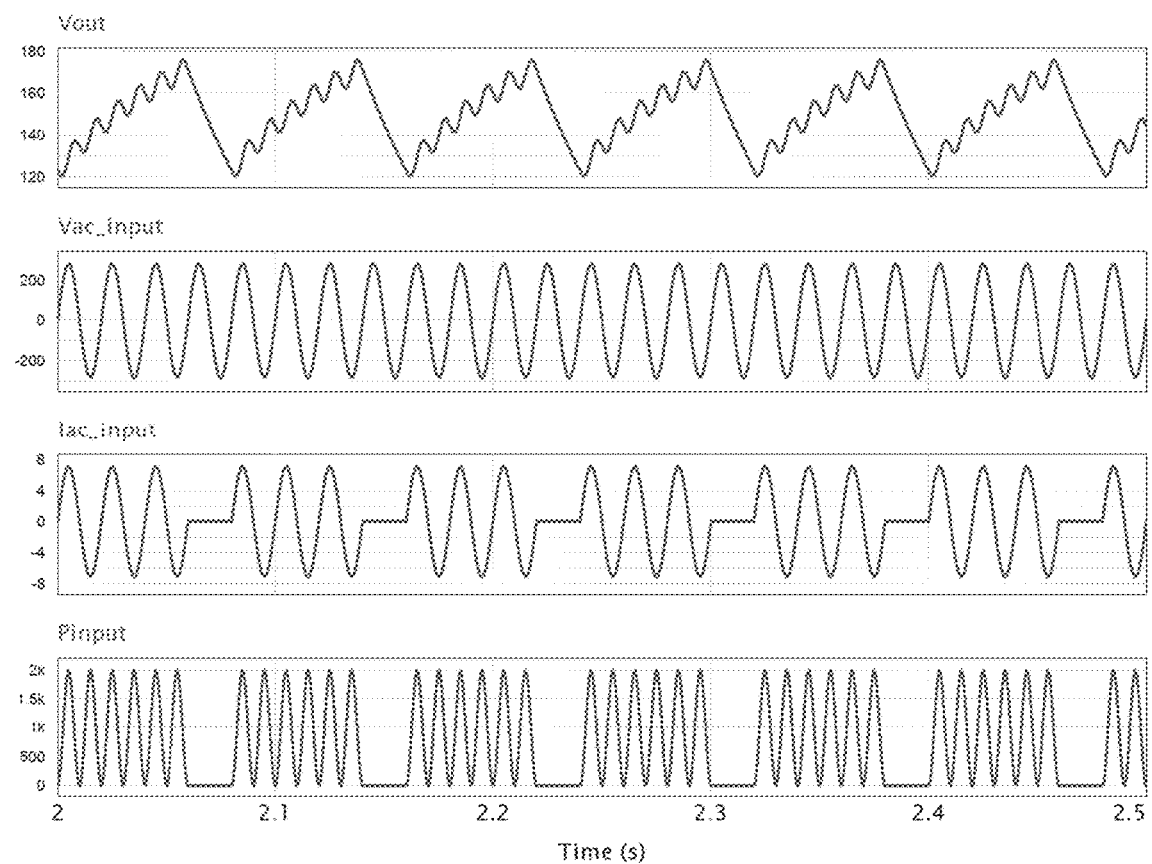
FIG. 20 shows simulation waveforms for sub-double-line frequency modulation, wherein N_half_low=6, N_half_ zero=2, Vin=200V, Vo_avg=150V, Vo_rip_pp=55V, Pin_avg=750 W, and R_load=300, according to one embodiment.

When the input AC voltage is 200V, even if the converter operates at low-gain mode, Gain_low=1, the steady-state value of the output voltage will still be 200V, which is higher than the required 150V. Therefore, the converter should operate at low-gain mode and zero-gain mode. FIG. 20 shows simulation results when the converter operates at low-gain mode for 6 half-line cycles (N_half_low=6) and operates at zero-gain mode for 2 half-line cycles (N_half_zero=2). Then the output voltage may be regulated at 150V.

It is noted that the converter may also operate at high-gain mode and zero-gain mode to produce 150V but this will increase the voltage and/or current of the converter.

In the above example with the parameters: Vin_min=100V, Vin_max=200V, and Gain_low=1 and Gain_high=2, the max possible output voltage at Vin_min is Vin_min*Gain_high=200V. If higher output voltage is required, larger Gain_high may be implemented. The output voltage may then be regulated to any value between 200V and 0V.

3 Combination of Input Voltage Variation and Output Voltage Variation

The embodiments described above used variable gain modulation over sub-line frequency and sub-double-line frequency for an converter with power factor reaction to achieve (1) wide output voltage variation range when the input AC voltage is fixed; (2) fixed output voltage when the input AC voltage varies over a wide range. There are three operation modes: (1) high-gain mode, (2) low-gain mode, and (3) zero-gain mode.

It was demonstrated above that by adjusting the gain value of either high-gain mode or low-gain mode, or both, the output voltage may be regulated continuously.

In a practical implementation, the input AC voltage could have a wide variation range and the output voltage could also have a wide regulation range. A control method according to embodiments described herein can also achieve this objective.

The following assumptions are made to illustrate a detailed implementation, as one example:

Assumption 3.1: Sub-double-line frequency modulation is used since it will produce lower output voltage ripple.

Assumption 3.2: Input AC voltage variation range may be from 100V rms to 200V rms with line frequency of 50 Hz.

Assumption 3.3: Output voltage may be regulated at any value between 100V DC to 200V DC.

Assumption 3.4: The load current is 5 A under all output voltages. The analysis result will be the same for different load currents.

Assumption 3.5: The high-gain value is Gain_high=2 and it may be changed from 1.8 to 2.2 (for a ±10% change) while maintaining high performance operation.

Assumption 3.6: The low-gain value is Gain_low=1 and it may be changed from 0.9 to 1.1 (for a ±10% change) while maintaining high performance operation.

The following tables provide a summary of the operating conditions to achieve the above design requirements, according to simulations.

TABLE 1

Operating conditions for required output voltage Vo_avg = 100 V

| Case # | Vin | N_half_low | N_half_high | N_half_zero | Gain_low | Gain_high | Vo_avg |
|---|---|---|---|---|---|---|---|
| Case 1.1 | 100 V | Continuous | NO | NO | 1 | NO | 100.0 V |
| Case 1.2 | 120 V | 2 | NO | 10 | 1 | NO | 100.5 V |
| Case 1.3 | 150 V | 2 | NO | 4 | 1 | NO | 100.5 V |
| Case 1.4 | 180 V | 4 | NO | 3 | 0.97 | NO | 100.1 V |
| Case 1.5 | 200 V | 2 | NO | 2 | 1 | NO | 100.1 V |
| Case 1.6 | 155 V | 2 | NO | 4 | 0.99 | NO | 99.5 V |

Notes:

An error of less than 0.5V (0.5% of 100V) is assumed. When the output voltage is between 99.5V and 100.5V, it is considered that 100V is achieved.

In case 1.4, a voltage gain value of 0.97 at low-gain mode operation is needed to fine tune the output voltage to 100V.

Comparing case 1.3 and case 1.6, when input voltage is increased from 150V to 155V, a voltage gain value of 0.99 at low-gain mode operation is used to fine tune the output voltage to 100V. N_half_low and N_zero value remains the unchanged.

In all cases, Vo_avg=100V and Vin=100V to 200V, only low-gain mode operation and zero-gain mode operation are needed. High-gain mode operation is not activated.

NO means No Operation for that operation mode.

For case 1.4, the converter operates at low-gain mode for 4 half line cycles (N_half_low=4), operates at zero-gain mode for 3 half line cycles (N_half_zero=3), and the actual gain value at low-gain mode is 0.97. Then the output DC voltage is 100.1V. The converter does not operate at high-gain mode.

TABLE 2

Operating conditions for required output voltage Vo_avg = 200 V

| Case # | Vin | N_half_low | N_half_high | N_half_zero | Gain_low | Gain_high | Vo_avg |
|---|---|---|---|---|---|---|---|
| Case 2.1 | 100 V | NO | Continuous | NO | NO | 2 | 200.0 V |
| Case 2.2 | 120 V | 2 | 4 | NO | 1 | 2 | 200.2 V |
| Case 2.3 | 150 V | 4 | 2 | NO | 1 | 2 | 200.2 V |
| Case 2.4 | 180 V | 9 | 1 | NO | 1 | 2 | 200.0 V |
| Case 2.5 | 200 V | Continuous | NO | NO | 1 | NO | 200.0 V |
| Case 2.6 | 155 V | 4 | 2 | NO | 1 | 1.88 | 200.6 V |

Notes:

In the above simulation, an error of less than 1.0V (0.5% of 200V) is assumed. When the output voltage is between 199V and 201V, it is considered that 200V is achieved.

Between case 2.3 and case 2.6, the N_half_low and N_half_high is the same for both conditions, Gain_high is changed to 1.88 for 155V input so that the output voltage may be regulated to 200V.

When input voltage is 100V, the rectifier operates at high-gain mode continuously. When the input is between 100V and 110V, the rectifier operates at high-gain mode operation continuously and the output voltage may be regulated to 200V by changing the gain of the rectifier (from 1.8 to 2).

When input voltage is 120V, the rectifier operates at low-gain mode for 2 half-line cycles and at high-gain mode for 4 half-line cycles.

When input voltage is at 200V, the rectifier operates at low-gain mode continuously. When the input voltage is between 180V to 200V, the output voltage may be regulated to 200V by changing the gain of the rectifier (from 0.9 to 1.0).

When the rectifier operates at low-gain mode for 9 half-line cycles and high-gain mode for 1 half-line cycle, the output voltage is also 200V.

TABLE 3

Operating conditions for required output voltage Vo_avg = 150 V

| Case # | Vin | N_half_low | N_half_high | N_half_zero | Gain_low | Gain_high | Vo_avg |
|---|---|---|---|---|---|---|---|
| Case 3.1 | 100 V | 4 | 4 | NO | 1 | 2 | 149.7 V |
| Case 3.2 | 120 V | 6 | 2 | NO | 1 | 2 | 150.1 V |
| Case 3.3 | 150 V | 4 | 2 | NO | 1 | 2 | 150.0 V |
| Case 3.4 | 180 V | 10 | NO | 2 | 1 | NO | 150.7 V |
| Case 3.5 | 200 V | 6 | NO | 2 | 1 | NO | 149.4 V |
| Case 3.6 | 155 V | Continuous | NO | NO | 0.97 | NO | 150.3 V |

Notes:
  In the above simulation, an error of less than 0.75V (0.5% of 150V) is assumed. When the output voltage is between 149.25V and 150.75V, it is considered that 150V is achieved.
  When input voltage is higher than 150V, high-gain mode operation is not selected. The AC-DC rectifier operates between low-gain mode and zero-gain mode.
  With case 3.6, the rectifier output voltage is regulated by changing the Gain_low value to 0.97 while operating continuously at low-gain mode.

The above analysis and simulation demonstrates that by the variable gain modulation based on sub-double-line frequency, the output voltage of an AC-DC rectifier can be regulated to any value between 100V and 200V (a 2:1 ratio) over an input AC voltage from 100V to 200V (a 2:1 ratio) by high-gain and low-gain mode operation. The value of the gain variation is less than 10% for low-gain mode operation (between 0.9 and 1.1) and high-gain mode operation (between 1.8 and 2.2). The total voltage gain variation is 4:1. The lowest voltage gain is when Vin=200V rms and Vo=100V (gain of 0.5). The highest voltage gain is when Vin=100V rms and Vo=200V (gain of 2). Therefore, a 4:1 input to output voltage variation has been achieved with only ±10% actual gain variation of the AC-DC converter.

4 Implementation

The above sections provide detailed operation principles of the variable gain modulation of an AC-DC rectifier. This section describes implementation details of variable gain modulation using sub-double-line frequency modulation as an example.

The following assumptions are made:
  Assumption 4.1: Input AC rms voltage variation range is Vin_min to Vin_max.
  Assumption 4.2: Output voltage variation range is Vo_avg_min to Vo_avg_max.
  Assumption 4.3: An AC-DC rectifier is implemented based on the above requirement and the average output voltage Vo_avg may be regulated at any value between Vo_avg_min and Vo_avg_max over the entire input voltage variation range, from Vin_min to Vin_max.
  Assumption 4.4: The designed gain value at high-gain mode operation is Gain_high. Gain_high may be adjusted from Gain_high_min to Gain_high_max. It is further assumed that Gain_high_min is 10% lower than Gain_high, and Gain_high_max is 10% higher than Gain_high, such that the gain variation is ±10%.
  Assumption 4.5: The designed gain value at low-gain mode operation is Gain_low. Gain_low may be adjusted from Gain_low_min to Gain_low_max. It is further assumed that Gain_low_min is 10% lower than Gain_low, and Gain_low_max is 10% higher than Gain_low, such that the gain variation is ±10%.
  Assumption 4.6: The voltage gain is defined as the ratio of the average value of the DC output voltage over the rms value of the AC input voltage.
  Assumption 4.7: Sub-double-line frequency modulation is assumed. The operation mode of the AC-DC rectifier depends on half-line period, T_half_line. Within T_half_line, the rectifier will not change operation mode. It will stay either at zero-gain mode, or low-gain mode, or high-gain mode. For a 50 Hz system, T_half_line=10 ms. For a 60 Hz system, T_half_line=8.33 ms.
  Assumption 4.8: N_L refers to the number of half line periods, T_half_line, when the AC-DC rectifier operates at low-gain mode. N_H refers to the number of half-line periods, T_half_line, when the AC-DC rectifier operates at high-gain mode. N_Z refers to the number of half-line periods, T_half_line, when the AC-DC rectifier operates at zero-gain mode.
  Assumption 4.9: In order to simplify the analysis, it is assumed that the AC-DC rectifier changes operation mode when the AC input voltage is at zero crossing point. It is noted that the rectifier can change operation mode at any time.

In one embodiment, the selection of Gain_high meets the following requirement:

$$Vo\_avg\_max \; Gain\_high * Vin\_min \quad (10)$$

According to this requirement, at minimum input voltage, the AC-DC rectifier may be able to produce the maximum output voltage.

Embodiments may be implemented, at least in part, as an algorithm in a controller of a converter. According to one embodiment, key steps of an algorithm may include the following:

Step 1: The actual input AC voltage, Vin, is sensed. Vin is between Vin_min and Vin_max.

Step 2: The desired output voltage is determined, Vo_avg. Vo_avg is between Vo_avg_min and Vo_avg_max.

Step 3: Two threshold voltage levels are calculated:

$$Vo\_th1 = Vin * Gain\_low \quad (11.1)$$

$$Vo\_th2 = Vin * Gain\_high \quad (11.2)$$

Step 4: Determine the operation modes: modulation between zero-gain mode and low-gain mode, and modulation between low-gain mode and high-gain mode.

Condition 1: $Vo\_avg \leq Vo\_th1$ \quad (12.1)

Condition 2: $Vo\_th1 < Vo\_avg \leq Vo\_th2$ \quad (12.2)

Step 5: If condition 1 as shown in equation (12.1) is satisfied, step 6 may be used to determine the control parameters. If condition 2 as shown in equation (12.2) is satisfied, step 7 may be used to determine the control parameters.

Step 6: with condition 1 satisfied, the AC-DC rectifier may be modulated between low-gain mode and zero-gain mode. N_L, N_Z, and Gain_low may be determined so that the average output voltage is regulated to Vo_avg.

Step 6.1: Determine N_L and N_Z (e.g., based on a look up table with the measured Vin and desired Vo_avg value) so that the output voltage is close to the required output voltage, Vo_avg. The look-up table may be generated based on the design requirement and low-gain value.

Step 6.2: With the N_L and N_Z obtained in Step 6.1, change the value of the low-gain of the AC-DC Rectifier to produce the desired output voltage, Vo_avg. This may be performed by a feedback circuit.

Note 6.1: The general guideline is to select smallest possible value of N_L and N_Z to produce the output voltage that is close to the required output voltage Vo_avg so that the low frequency ripple at the output voltage may be minimized.

Note 6.2: Look-up table method is an example for Step 6.1. Other methods to determine N_L and N_Z may also be used, such as feedforward, feedback, as well as logic circuit with digital control.

Note 6.3: Determining the low-gain value Gain_low to produce the desired output voltage Vo_avg may be performed by feedback circuit.

Note 6.4: Under condition 1, the period of the output voltage low frequency ripple may be calculated as:

$$T\_rip1 = T\_half\_line * (N\_L + N\_Z) \tag{13}$$

Step 7: with condition 2 satisfied, the AC-DC rectifier may be modulated between low-gain mode and high-gain mode. N_H, N_L, and Gain_low, Gain_high may be determined so that the average output voltage is regulated to Vo_avg.

Step 7.1: Determine N_H and N_L based on a look up table with the measured Vin and desired Vo_avg value so that the output voltage is close to the required output voltage, Vo_avg. The look-up table may be generated based on the design requirement and low-gain value, high-gain value.

Step 7.2: With the N_H and N_L obtained in Step 7.1, change the value of low-gain (when the rectifier operates at low-gain mode), or the value of high-gain (when the rectifier operates at high-gain mode), or both, of the AC-DC rectifier to produce the desired output voltage, Vo_avg. This may be performed by a feedback circuit.

Note 7.1: In one embodiment the smallest possible values of N_L and N_H may be selected to produce an output voltage that is close to the required output voltage, Vo_avg, so that the low frequency ripple at the output voltage can be minimized. N_L, N_H may be obtained by a look up table depending on measured input voltage, Vin, and the desired output voltage, Vo_avg, as well as Gain_low and Gain_high values, which are known after the design is completed. Other methods, such as feedforward, feedback, or logic circuit may also be used to determine N_L and N_H.

Note 7.2: Step 7.1 and Step 7.2 may be repeated a two or more times to optimize N_L, N_H, and low-gain value, Gain_low, high-gain value, Gain_high, to produce the desired output voltage, Vo_avg.

Note 7.3: Under condition 2, the period of the output voltage low frequency ripple may be calculated as:

$$T\_rip2 = T\_half\_line * (N\_L + N\_H) \tag{14}$$

Note 7.4: T_rip1 and T_rip2 may be several times greater than the half line cycle. Therefore, it will take a time period equal to several T_rip1, or T_rip2, for the control loop to produce the desired output voltage, Vo_avg. For example, it may take 5 to 20 half line cycles for the control loop to become steady state and produce a stable output voltage, Vo_avg.

Note 7.5: In one operating mode the AC-DC rectifier may operate at high-gain mode all the time without operating at low-gain mode. This may happen when the input voltage is low, and the required output voltage is high. The output voltage may be regulated to the designed value by changing the value of Gain_high.

Note 7.6: In another operating mode the AC-DC rectifier may operate at low-gain mode all the time without operating at high-gain mode. This may happen when the input voltage is high, and the required output voltage is low. The output voltage may be regulated to the desired value by changing the value of Gain_low.

Special Case 1

This section discusses a special case condition. If the input AC voltage is either 110V or 220V and the output voltage of the AC-DC rectifier is a fixed voltage, such as, for example, 50V, the variable gain modulation strategy may be simplified as follows:

Assumption 4.1.1: Input voltage changes between 100V and 140V or between 190V and 240V.

Assumption 4.1.2: The output voltage is fixed at Vo_avg=50V.

Assumption 4.1.3: The high-gain value, Gain_high, is two times the low-gain value, Gain_low. Gain_high=2*Gain_low.

The variable gain modulation strategy may be implemented as follows:

Step 7.4.1: When input voltage is between 100V and 140V, the AC-DC rectifier operates only at high-gain mode. The output voltage may be controlled by changing the gain value of Gain_high.

Step 7.4.2: The gain value range may be designed as:

$$Gain\_high\_req\_min = 50V/140V = 0.36 \tag{15.1}$$

$$Gain\_high\_req\_max = 50V/100V = 0.50 \tag{15.2}$$

Under these conditions, if the gain of the AC-DC rectifier may be adjusted from 0.36 to 0.50 when the rectifier operates at high-gain mode, the output voltage may be regulated at 50V when the input voltage changes from 100V to 140V.

Step 7.4.3: When the input voltage is between 190V and 240V, the AC-DC rectifier operates only at low-gain mode. The output voltage may be controlled by changing the gain value of Gain_low.

Step 7.4.4: The gain value range should be designed as:

$$Gain\_low\_req\_min = 50V/240V = 0.21 \tag{16.1}$$

$$Gain\_low\_req\_max = 50V/190V = 0.26 \tag{16.2}$$

Under these conditions, if the gain of the AC-DC rectifier may be adjusted from 0.21 to 0.26 when the rectifier operates at low-gain mode, the output voltage may be regulated at 50V when the input voltage changes from 190V to 240V.

Step 7.4.5: The actual high-gain value of the AC-DC Rectifier may be designed to the following range:

$$\text{Gain\_high\_act\_min}=0.36 \quad (17.1)$$

$$\text{Gain\_high\_act\_max}=0.52 \quad (17.2)$$

or $$\text{Gain\_high\_act}=0.44\pm18\% \quad (17.3)$$

Then the actual low-gain value of the AC-DC Rectifier may be (based on assumption 4.1.3):

$$\text{Gain\_low\_act\_min}=0.36/2=0.18 \quad (18.1)$$

$$\text{Gain\_low\_act\_max}=0.52/2=0.26 \quad (18.2)$$

or $$\text{Gain\_low\_act}=0.22\pm18\% \quad (18.3)$$

Step 7.4.6: With the design obtained in step 7.4.5, the AC-DC rectifier operates at high-gain mode when input voltage is low (100-140V) and operate at low-gain mode when the input voltage is high (190-240V) and produces the required output voltage (50V) by changing the voltage gain value of the rectifier.

Special Case 2

If for example it is required that the output voltage should also be regulated at 50V when the input voltage is between 140V and 190V, or it is required that the output voltage should be maintained at 50V when the input voltage is at any value between 100V to 240V, the following control strategies may be used:

Condition #1: When the input voltage is between 100V and 140V, the AC-DC rectifier operates at high-gain mode and high-gain value is used to regulate the output voltage to the designed value, 50V.

Condition #2: When the input voltage is between 190V and 240V, the AC-DC rectifier operates at low-gain mode and the low-gain value is used to regulate the output voltage to the designed value, 50V.

Condition #3: When the input voltage is between 140V and 190V, sub-double-line frequency modulation may be used. The AC-DC rectifier operates alternatively between high-gain mode and low-gain mode. The N_L and N_H value, as well as high-gain value and low-gain value are used to regulate the output voltage to the designed value, 50V. Detailed control methods are described above.

5 Example: LLC Converter Implementation of the Above Control Strategy

In general, the above-described control strategy may be implemented in different converter topologies. As mentioned above, various topologies, such as full-bridge PWM converter, full-bridge LLC resonant converter, can operate at two voltage gains when they operate at full-bridge mode (high-gain mode) and half-bridge mode (low-gain mode). Operation under two voltage gains may be optimized for the specific converter topology used. This section describes implementation of the variable gain modulation control strategy for a LLC converter.

When the resonant parameters, transformer turns ratio, and load resistor value are the same, the voltage gain at full-bridge operation is two times the voltage gain at half-bridge operation.

$$\text{Gain\_LLC\_FB}=2*\text{Gain\_LLC\_HB} \quad (19)$$

Zero-gain mode operation of an LLC AC-DC rectifier may be achieved when all four switches stop switching (i.e., the switches are off).

An LLC resonant converter can operate as an AC-DC rectifier and achieve power factor correction (PFC). FIG. 21A is a circuit diagram of an LLC converter used as an AC-DC rectifier with power factor correction. The AC input voltage is rectified by the diode bridge. The rectified AC voltage (Vrec) is applied to the input of the LLC converter. FIG. 21B is a controller block diagram for controlling the LLC converter to achieve PFC operation. The output of the voltage error amplifier is the current reference for the input LLC current. The switching frequency of the LLC converter is changed so that the LLC input current is a rectified sinusoidal waveform with required peak value, determined by Iref. By controlling the input current of the LLC converter (Irec) to follow a sinusoidal waveform, the AC input current can be controlled to be a sinusoidal waveform and achieve power factor correction. By selecting the resonant parameter and transformer turns ratio, the output voltage can be regulated at a desired value. It is noted that the input capacitor, Cin, (as shown in FIG. 21A) is a small value used to filter out the switching frequency ripple.

When all four switches Q1, Q2, Q3, and Q4 are switching, the LLC converter operates at full-bridge mode. When Q1 and Q2 are switching, Q3 is off all the time, and Q4 is on all the time, the LLC converter operates at half-bridge mode. The gain at full-bridge mode is two times the gain of the half-bridge mode.

5.1 Output Voltage is Fixed and Input Voltage has a Wide Range

In this analysis, it is assumed that a large energy storage capacitor is connected at the output of the LLC AC-DC rectifier so that the output voltage is a DC voltage with small low frequency ripple.

It is assumed that:

Assumption 5.11: Input AC voltage is changed from 100V to 240V.

Assumption 5.12: The output voltage of the LLC AC-DC rectifier is regulated at 50V.

In one embodiment, the control strategy may be as follows:

Step 5.11: When the input voltage is between 100V to 140V, the LLC AC-DC rectifier operates at full-bridge mode. The output voltage is controlled by changing the gain of the full-bridge LLC rectifier, Gain_LLC_FB.

Step 5.12: The required gain value range may be designed as:

$$\text{Gain\_LLC\_FB\_req\_min}=50V/140V=0.36 \quad (20.1)$$

$$\text{Gain\_LLC\_FB\_req\_max}=50V/100V=0.50 \quad (20.2)$$

This means that the gain of the LLC AC-DC rectifier should be designed between 0.36 and 0.50 when it operates at full-bridge mode. Under this situation, the output voltage may be regulated at 50V when the input voltage changes from 100V to 140V.

Step 5.13: When the input voltage is between 190V and 240V, the LLC AC-DC Rectifier operates at half-bridge mode. The output voltage is controlled by changing the gain value of half-bridge LLC rectifier, Gain_LLC_HB.

Step 5.14: The required gain value may be designed as:

$$\text{Gain\_LLC\_HB\_req\_min}=50V/240V=0.21 \quad (21.1)$$

$$\text{Gain\_LLC\_HB\_req\_max}=50V/190V=0.26 \quad (21.2)$$

This means that the gain of the LLC AC-DC rectifier should be designed between 0.21 and 0.26 when it operates at half-bridge mode. The output voltage is controlled by changing the gain value of LLC rectifier, Gain_LLC_HB, when the input voltage changes from 190V to 240V.

Step 5.15: Since Gain_LLC_FB=2*Gain_LLC_HB, the actual gain of the LLC AC-DC rectifier operating at full-bridge mode may be designed for the following range:

Gain_LLC_FB_act_min=0.36   (22.1)

Gain_LLC_FB_act_max=0.52   (22.2)

or

Gain_LLC_FB_act=0.44±18%   (22.3)

In this condition, the actual gain range of the LLC AC-DC rectifier operating at half-bridge mode will be as follows:

Gain_LLC_HB_act_min=0.18   (23.1)

Gain_LLC_HB_act_max=0.26   (23.2)

or

Gain_LLC_HB_act=0.22±18%   (23.3)

Step 5.16: When the input AC voltage is between 140V and 190V, sub-double-line frequency modulation may be used and the LLC AC-DC rectifier operates alternatively between full-bridge mode and half-bridge mode.

For example, if Vin=150V, then the output of the LLC AC-DC rectifier can be maintained under the following operating conditions:

Gain_LLC_FB=0.45   (24.1)

Gain_LLC_HB=0.21   (24.2)

$N$_half_FB=2 and $N$_half_HB=2   (24.3)

N_half_FB=2 indicates that the LLC AC-DC rectifier operates at full-bridge mode for two half line cycles. N_half_HB=2 indicates that the LLC AC-DC rectifier operates at half-bridge mode for two half line cycles. It is also noted that Gain_LLC_FB=0.45 and Gain_LLC_HB=0.21 are within the designed gain range.

For other input AC voltage between 140V and 190V, N_half_FB and N_half_HB may be determined first using a look-up table and then the required gain value of Gain_LLC_HB and Gain_LLC_FB may be determined using a feedback circuit, as described above.

Using the above control strategy, it has been demonstrated that with the gain variation range of ±18%, the LLC AC-DC rectifier can maintain the output voltage at 50V when the input voltage changes from 100V to 240V, or a change range of 2.4:1, or 170V±41%.

An LLC converter with gain range of ±18% will have much better performance than a gain range of ±41%. Therefore, the benefit of the sub-double-line frequency modulation has been demonstrated.

5.2 Output Voltage and Input Voltage have a Wide Range

For an LLC AC-DC rectifier as presented in section 5.1, if the output voltage is to be regulated at any value between 40V and 60V and the gain range is close to ±10%, then the gain of the LLC AC-DC rectifier may be designed as follows:

Step 5.21: In order to achieve Vo=60V when the input voltage is Vac=100V, the maximum gain of the LLC AC-DC rectifier operating at full-bridge mode may be:

Gain_LLC_FB_max=60V/100V=0.6   (25.1)

Gain_LLC_FB_nom=0.6/(1+0.1)=0.55   (25.2)

Gain_LLC_FB_min=0.55*(1−0.1)=0.5   (25.3)

Gain_LLC_FB=0.55±10%   (25.4)

The gain range of the half-bridge operation is:

Gain_LLC_HB_max=0.3   (26.1)

Gain_LLC_HB_nom=0.275   (26.2)

Gain_LLC_HB_min=0.25   (26.3)

Gain_LLC_HB=0.275±10%   (26.4)

The following tables provide examples of a control strategy to achieve the above design requirement.

TABLE 5.21

Required output voltage is Vo = 50 V

| Case # | Vin | Control Strategy |
|---|---|---|
| Case 5.1 | 100 V-167 V | Combination of full-bridge mode and half-bridge mode operation (Sub-Double-Line frequency modulation), N_LLC_HB, N_LLC_FB, and gain value change (Gain_LLC_FB and Gain_LLC_HB change) |
| Case 5.2 | 168 V to 200 V | Half-bridge mode. Output voltage is regulated by half-bridge voltage gain variation from 0.25 to 0.3. |
| Case 5.3 | 201 V to 240 V | Combination of half-bridge mode and Zero-Gain mode operation (Sub-Double-Line frequency modulation), N_LLC_HB, N_LLC_ZG, and gain value change (Gain_LLC_HB) |

TABLE 5.22

Required output voltage is Vo = 40 V

| Case # | Vin | Control Strategy |
|---|---|---|
| Case 5.4 | 100 V-133 V | Combination of full-bridge mode and half-bridge mode operation (Sub-Double-Line frequency modulation), N_LLC_HB, N_LLC_FB, and gain value change (Gain_LLC_FB and Gain_LLC_HB change) |
| Case 5.5 | 134 V to 160 V | Half-bridge mode. Output voltage is regulated by half-bridge voltage gain variation from 0.25 to 0.3. |

TABLE 5.22-continued

Required output voltage is Vo = 40 V

| Case # | Vin | Control Strategy |
|---|---|---|
| Case 5.6 | 161 V to 240 V | Combination of half-bridge mode and Zero-Gain mode operation (Sub-Double-Line frequency modulation), N_LLC_HB, N_LLC_ZG, and gain value change (Gain_LLC_HB) |

TABLE 5.23

Required output voltage is Vo = 60 V

| Case # | Vin | Control Strategy |
|---|---|---|
| Case 5.7 | 100 V-120 V | Full-bridge mode. Output voltage is regulated by full-bridge voltage gain variation from 0.5 to 0.6 |
| Case 5.8 | 121 V to 200 V | Combination of full-bridge mode and half-bridge mode operation (Sub-Double-Line frequency modulation), N_LLC_HB, N_LLC_FB, and gain value change (Gain_LLC_FB and Gain_LLC_HB change) |
| Case 5.9 | 200 V to 240 V | Half-bridge mode. Output voltage is regulated by half-bridge voltage gain variation from 0.25 to 0.3 |

Therefore, with sub-double-line frequency modulation among three possible operation modes (full-bridge, half-bridge and zero-gain), the output voltage may be regulated at any value between 40V and 60V when the input voltage changes from 100V to 240V, even though the gain variation of LLC AC-DC rectifier is ±10%.

In general, if the LLC AC-DC rectifier is required to produce an output voltage from Vo_avg_min to Vo_avg_max when the input voltage has a wide variation range from Vin_min to Vin_max, then the following guidelines are suggested:

Guideline 5.1: When input voltage is close to Vin_min and the required output voltage is close to Vo_avg_max, full-bridge mode operation may be used. The output voltage is controlled by the switching frequency of the full-bridge LLC converter.

Guideline 5.2: When input voltage is close to Vin_max and the required output voltage is close to Vo_avg_min, half-bridge mode operation may be used. The output voltage is controlled by the switching frequency of the half-bridge LLC converter. If the output voltage cannot be regulated to Vo_avg_min by half-bridge mode operation, sub-double-line frequency modulation (combination of half-bridge mode and zero-gain mode) may be used to regulate the output voltage to Vo_avg_min.

Guideline 5.3: When input voltage is close to Vin_max and the required output voltage is close to Vo_avg_max, full-bridge mode and half-bridge mode operations may be used alternatively. The output voltage is controlled by a combination of switching frequency of full-bridge operation, the switching frequency of half-bridge operation, and the ratio of time interval when the converter operates at half-bridge mode over full-bridge mode, or N_LLC_FB/N_LLC_HB.

Guideline 5.4: When input voltage is close to Vin_min and the required output voltage is close to Vo_avg_min, full-bridge mode and half-bridge mode operations may be used alternatively. The output voltage is controlled by a combination of switching frequency of full-bridge operation, the switching frequency of half-bridge operation, and the ratio of time interval when the converter operates at half-bridge mode over full-bridge mode, or N_LLC_FB/N_LLC_HB.

Guideline 5.5: For other input voltage value and other required output voltage value, more detailed analysis may be made to find optimal values of N_LLC_FB, N_LLC_HB, and Gain_LLC_FB and Gain_LLC_HB.

Guideline 5.6: N_LLC_FB and N_LLC_HB may be obtained by, e.g., a look up table based on the input voltage, Vin, output voltage, Vo_avg, and the Gain_LLC_FB, Gain_LLC_HB. Vin can be measured from the input. Vo_avg may be obtained from the system, and Gain_LLC_FB and Gain_LLC_HB are known after the design is completed.

Guideline 5.7: A closed loop control circuit may be used to change the switching frequency of the LLC AC-DC rectifier so that the desired output voltage, Vo_avg, is obtained.

FIG. 22 is a block diagram of a controller that may be implemented for an LLC AC-DC rectifier over wide input voltage variation range to achieve the control strategy described above, according to one embodiment.

The input AC voltage, Vac, output voltage, Vo, and output reference voltage, Vref, are fed into a mode selection block 2210. Based on Vac, Vref, and Vo, and using the methods as described in section 4.1 and 4.2, the mode selection block determines which mode of the five possible modes of operation should be selected: (1) half-bridge mode, (2) full-bridge operation (also referred to as single mode of operation), and (3) half-bridge+full-bridge (HB+FB), (4) half-bridge+Zero-Gain (HB+ZG), or (5) full-bridge+Zero-Gain (FB+ZG) (also referred to as dual mode operation). When the mode is selected (2220 in FIG. 22), the appropriate mode control signal (dashed line) is sent to the gate driver block 2230 of the controller that generates the gate drive signals G1 to G4 for the converter switches to implement the mode in the converter. In FIG. 22, the five modes of the gate driver block are shown separately as Controller 1 to Controller 5, however, it will be appreciated that in an actual implementation there is one gate driver block 2230 that receives the mode control signal corresponding to the selected mode from the mode selector.

When half-bridge mode operation is selected, controller 1 determines the switching frequency based on the output voltage and reference voltage so that the output voltage Vo is regulated to the reference voltage Vref. The input voltage may be monitored all the time. The controller generates four gate drive signals for the switches (MOSFETs) of the LLC AC-DC rectifier (e.g., as shown in FIG. 21A). Fs_HB is the switching frequency of the LLC converter when operating at half-bridge mode.

When full-bridge mode operation is selected, controller 2 determines the switching frequency based on the output voltage and reference voltage so that the output voltage Vo is regulated to the reference voltage Vref. The input voltage may be monitored all the time. The controller generates gate drive signals for the MOSFETs of LLC AC-DC rectifier as shown in FIG. 21A. Fs_FB is the switching frequency of the LLC converter when operating at full-bridge mode.

When combination of half-bridge and full-bridge mode operation is selected (sub-double-line frequency modulation), controller 3 will determine N_HB, N_FB, Fs_FB and Fs_HB, based on the output voltage and reference voltage so that the output voltage Vo is regulated to the reference voltage Vref. The input voltage may be monitored all the time. Controller 3 generates gate drive signals for the MOSFETs of LLC AC-DC rectifier as shown in FIG. 21A. N_HB is the number of half line cycles when the LLC converter operates at half-bridge mode. N_FB is the number of half line cycles when the LLC converter operates at full-bridge mode.

When combination of half-bridge and Zero-Gain mode operation is selected (sub-double-line frequency modulation), controller 4 determines N_HB, N_ZG, and Fs_HB, based on the output voltage and reference voltage so that the output voltage Vo is regulated to the reference voltage Vref. The input voltage may be monitored all the time. Controller 4 generates four gate drive signals for the MOSFETs of LLC AC-DC rectifier as shown in FIG. 21A. N_ZG is the number of half line cycles when the LLC converter operates at Zero-Gain mode, which is achieved by no switching of all four switches (e.g., Q1, Q2, Q3, and Q4 as shown in FIG. 21A).

When combination of full-bridge and Zero-Gain mode operation is selected (sub-double-line frequency modulation), controller 5 determines N_FB, N_ZG, and Fs_FB, based on the output voltage and reference voltage so that the output voltage Vo is regulated to the reference voltage Vref. The input voltage may be monitored all the time. The controller generates gate drive signals for the MOSFETs of LLC AC-DC rectifier as shown in FIG. 21A. It is noted that in most cases, the combination of half-bridge and Zero-Gain mode operation is preferred over the combination of full-bridge and Zero-Gain mode operation because an output voltage that is lower than the half-bridge mode of operation is required in this case.

In one embodiment, for dual mode operation (sub-double-line frequency modulation operation), the N_FB, N_HB, and N_ZG may be selected based on Vac, Vref, and Vo by a look up table since the selection is limited. The actual output voltage Vo may be regulated by the switching frequency, Fs_FB and Fs_HB by a feedback loop.

When the input voltage and output voltage changes, the mode selection block will change one operation mode to the other. The mode change may occur at zero crossing point of the input AC voltage.

It will be appreciated that the control diagram shown in FIG. 22 may also be implemented for any AC-DC rectifier based on other circuit topologies.

6 Inner-Line Frequency Modulation for LLC Converter

The sub-double-line frequency modulation method will produce a low frequency ripple with frequency lower than the double line frequency, such as 25 Hz in the case of 50 Hz line frequency AC system. With inner-line frequency modulation described in this section, the output voltage may be reduced while the low frequency ripple is maintained at double line frequency.

FIG. 23 shows waveforms for an LLC converter under conventional control. In the figure, the x-axis is degrees, from 0-degree to 359-degree, which represents a complete AC line cycle. The rectified input voltage (top), current (middle), and input power (bottom) waveforms are shown. With conventional control, the LLC converter operates from 0-degree to 180-degree, as shown in FIG. 23. With the parameters used in the waveforms, the average input power is P51=220 W.

According to inner-line frequency modulation, the LLC converter operates (i.e., is turned on) for a time interval that is shorter than the half line period. The LLC converter stops operating (or is turned off) for the rest of the half line period.

An example of waveforms for inner-line frequency modulation are shown in FIG. 24 for a complete line cycle. Rectified input voltage (top), current (middle), and input power (bottom) waveforms are shown. Referring to FIG. 24, for the first half line cycle:

- The LLC converter stops operation between 0 degree and 49-degree.
- The LLC converter stops operation between 131-degree and 179-degree.
- The LLC converter operates between 50-degree and 130-degree.

For the next half line cycle:

- The LLC converter stops operation between 180-degree (0+180) and 229-degree (49+180)
- The LLC converter stops operation between 311-degree (131+180) and 359-degree (179+180)
- The LLC converter operates between 230-degree (50+180) and 310-degree (130+180)

When LLC converter operates, it can operate at either full-bridge or half-bridge mode. In the example as shown in FIG. 24, the average input power is P52=168 W. Since P52 is lower than P51, the output voltage in the case of FIG. 24 is lower than that in FIG. 23. This can be shown as follows:

Assume that the load current is the same at Io and loss is neglected. Then, Pin=Pout=Vo*Io.
Therefore, $$V51=P51/Io \text{ and } V52=P52/Io$$

Since P52<P51, then V52<V51. Therefore, with inner-line frequency modulation, the output voltage can be reduced.

It is noted that the turn-on operation of the LLC AC-DC rectifier does not need to be symmetrical to the 90-degree point (the peak value of the AC voltage). For example, it may be asymmetrical to 90-degree point, such as from 50-degree to 110-degree or from 70-degree to 140-degree.

FIG. 25 shows another example of an implementation of inner-line frequency modulation when the LLC converter operates (is turned on) between 0-degree to 60-degree and does not operate (is turned off) between 61-degree and 179-degree. With the parameters used in the figure, the average input power is about P53=44 W. The output voltage (V53) will be lower than the above two cases.

In the above analysis, the input current is controlled to follow the input voltage waveform when the LLC converter is turned on (in operation). It is a portion of the sinusoidal waveform. The input current is zero when LLC converter is off (not in operation).

The output voltage, which is determined by the input power, may be controlled by the duration when the LLC converter is on. For example, in FIG. 26, when the LLC converter is turned on between 60-degree and 120-degree, the input power is P55=136 W, which is smaller than P52=168 W when LLC converter is turned on between 50-degree to 130-degree.

It is noted that the input current may be controlled to any waveform when LLC converter is on. FIG. 27 shows an example of the inner-line frequency modulation when the input current is controlled to be a constant value when the LLC converter is on. In this case, the average input power is P54=129 W.

The output voltage, which is determined by the input power, may also be controlled by the peak current when LLC converter is on. For example, FIG. 28 shows the waveforms when the peak current is controlled to be 1 A (reduced from 1.4 A for the case shown in FIG. 24), the input power is P56=119 W.

In some applications it may be more desirable to turn on the LLC converter when the instantaneous input voltage is higher, such as at about 90-degree region.

An embodiment of a control circuit to implement inner-line frequency modulation is shown in FIG. 29. A voltage error amplifier uses the output voltage Vo, reference voltage Vref, and rectified AC voltage Vrec as inputs and produce a reference current Iref as input to a current loop. A current error amplifier forces the rectified input current Irec to be equal to the reference current Iref by changing the switching frequency Fs. A gate driver and logic circuit produces gate drive signals for the four primary switches in the LLC converter. Input AC voltage Vac is sensed to detect the zero-crossing point of the AC input. Theta_start is the starting degree when the LLC converter starts operation (on). Theta_stop is the stopping degree when the LLC converter stops operation (off). The difference between Theta_stop and Theta_start is the conduction angle (which represents the conduction time) of the LLC converter. By changing the conduction angle, the output voltage may be changed. In one embodiment the values of Theta_start and Theta_stop may be pre-determined, which simplifies the control logic.

It is noted that the inner-line frequency modulation method may also be applied to other AC-DC converter topologies, such as boost converter, isolated boost converter, as well as LCC resonant converters. It is also noted that when boost converter operates at AC-DC rectifier, the output voltage is higher than the peak AC line voltage. Therefore, when the boost switch stops switching, the boost diode will be reverse biased, and no energy will be transferred from AC side to the output DC side. A slight difference between boost converter and LLC converter is that the inductance value of the boost inductor is much larger than the resonant inductor in LLC converter. During the transition between on operation and off operation, the energy stored in the boost inductor will be transferred to the output DC side.

To summarize: the output voltage of an AC-DC rectifier with inner-line frequency modulation control may be regulated by the following ways:

The peak current of the rectifier input current, or equivalently, the input power when the rectifier is turned on.
The conduction angle of the rectifier within the half line period.
The position relative to the AC half line cycle when the rectifier is turned on, such as near the zero crossing (0-degree to 60-degree) or close to the peak AC voltage (around 90-degree).

All cited publications are incorporated herein by reference in their entirety.

EQUIVALENTS

It will be appreciated that modifications may be made to the embodiments described herein without departing from the scope of the invention. Accordingly, the invention should not be limited by the specific embodiments set forth but should be given the broadest interpretation consistent with the teachings of the description as a whole.

The invention claimed is:

1. A controller for an AC-DC converter comprising a rectifier circuit that converts AC input voltage into DC output voltage, the controller comprising:
control logic that controls the rectifier circuit according to two or more operating modes;
wherein each operating mode of the two or more operating modes determines a different corresponding constant gain of the rectifier circuit and each operating mode is maintained for a selected integer number of a half-line period of the AC input voltage;
wherein the controller selects an operating mode from the two or more operating modes based on at least one of an AC input voltage value and a required DC output voltage value;
wherein the AC-DC converter provides a wide range of DC output voltage with power factor correction.

2. The controller of claim 1, wherein the two or more operating modes include high-gain mode, low-gain mode, and zero-gain mode.

3. The controller of claim 2, wherein the high-gain mode, low-gain mode, and zero-gain mode are alternatively implemented by the controller.

4. The controller of claim 1, wherein the controller controls the rectifier circuit to operate in first and second modes;
wherein the rectifier circuit operates in the first mode for a first integer number of a half-line period of the AC input voltage and the rectifier circuit operates in the second mode for a second integer number of the half-line period of the AC input voltage.

5. The controller of claim 1, wherein the DC output voltage contains a ripple voltage with a ripple frequency lower than an AC line frequency.

6. The controller of claim 1, wherein an LLC converter is used as the rectifier circuit;
wherein the controller controls the rectifier circuit according to full-bridge operating mode, half-bridge operating mode, and non-operating mode;
wherein the rectifier circuit is in full-bridge operating mode for a first integer number of a half-line period of the AC input voltage;
wherein the rectifier circuit is in half-bridge operating mode for a second integer number of the half-line period of the AC input line voltage;
wherein the rectifier circuit is in non-operating mode for a third integer number of the half-line period of the AC input voltage.

7. The controller of claim 6, wherein the DC output voltage of the AC-DC converter contains a low frequency ripple voltage;
wherein a frequency of the ripple voltage is related to the frequency of the AC input line voltage.

8. The controller of claim 6, wherein:
the rectifier circuit is in full-bridge mode when the input AC voltage is in a low range;
the rectifier circuit is in half-bridge mode when the input AC voltage is in a high-range;

the output DC voltage is regulated to a required DC value by changing the gain of the rectifier circuit in the full-bridge mode when input voltage is in the low range;

the output DC voltage is regulated to the required DC value by changing the gain of the rectifier circuit in the half-bridge mode when input AC voltage is in the high range.

9. The controller of claim 8, wherein the output DC voltage is regulated to the required value by alternatingly operating the rectifier circuit between full-bridge mode and half-bridge mode when input AC voltage is between the low range and the high range.

10. The controller of claim 6, wherein the rectifier circuit operates in full-bridge mode for one integer number of the half-line period of the AC input voltage and stops operating for another integer number of half-line period of the AC input voltage.

11. The controller of claim 6, wherein the output DC voltage is regulated to the required value by changing the gain of the rectifier circuit when it is operating in full-bridge mode.

12. The controller of claim 6, wherein the output DC voltage is regulated to the required value by changing a ratio of the first and second integer numbers.

13. The controller of claim 6, wherein the output DC voltage is regulated to the required value by a combination of changing the gain of the rectifier circuit and changing of ratio of the first and second integer numbers.

14. The controller of claim 6, wherein the rectifier circuit operates in half-bridge mode for a first integer number of the half-line period of the AC input voltage and stops operating for a second integer number of the half-line period of the AC input voltage.

15. The controller of claim 6, wherein the output DC voltage is regulated to the required value by changing the gain of the rectifier circuit operating in half-bridge mode.

16. An AC-DC converter comprising the controller of claim 6.

17. The controller of claim 1, wherein the controller controls the rectifier circuit so that the rectifier circuit is operating for a first portion of the AC input voltage half line period and the rectifier circuit is not operating for a second portion of the AC input voltage half line period.

18. The controller of claim 17, wherein the rectifier circuit is operating when an instantaneous AC input voltage is at or close to its peak value and the rectifier circuit is not operating when the instantaneous AC input voltage is at or close to its zero-crossing value.

19. The controller of claim 17, wherein the output DC voltage is regulated by controlling AC input power to the rectifier circuit during a time interval when the rectifier circuit is operating.

20. The controller of claim 17, wherein the output DC voltage is regulated by controlling a duration of a time interval when the rectifier circuit is operating.

21. The controller of claim 17, wherein the rectifier circuit is operating during a first portion of the AC input voltage half line cycle when an instantaneous AC input voltage is far away from an AC input peak voltage value and the rectifier circuit is not operating for the rest of the AC input voltage half line cycle.

22. An AC-DC converter comprising the controller of claim 17.

23. The AC-DC converter of claim 22, wherein the AC-DC converter is selected from a boost converter, isolated boost converter, PWM converter, LLC resonant converter, and LCC resonant converter.

24. An AC-DC converter comprising the controller of claim 1.

25. The AC-DC converter of claim 24, wherein the AC-DC converter is selected from a boost converter, isolated boost converter, PWM converter, LLC resonant converter, and LCC resonant converter.

* * * * *